April 3, 1951 P. S. SMITH 2,547,544

STRIP-FORMING AND FEEDING APPARATUS

Filed Feb. 26, 1949 14 Sheets-Sheet 1

INVENTOR.
PAUL S. SMITH
BY Clarence B. Desjardins
HIS ATTORNEY

April 3, 1951 P. S. SMITH 2,547,544

STRIP-FORMING AND FEEDING APPARATUS

Filed Feb. 26, 1949 14 Sheets-Sheet 2

INVENTOR.
PAUL S. SMITH
BY Clarence B. DesJardins
HIS ATTORNEY

April 3, 1951 P. S. SMITH 2,547,544

STRIP-FORMING AND FEEDING APPARATUS

Filed Feb. 26, 1949 14 Sheets-Sheet 3

INVENTOR.
PAUL S. SMITH
BY Clarence B. DesJardins
HIS ATTORNEY

STRIP-FORMING AND FEEDING APPARATUS

Filed Feb. 26, 1949 14 Sheets-Sheet 4

INVENTOR.
PAUL S. SMITH
BY Clarence B. Desjardins
HIS ATTORNEY

April 3, 1951 P. S. SMITH 2,547,544

STRIP-FORMING AND FEEDING APPARATUS

Filed Feb. 26, 1949 14 Sheets-Sheet 5

*INVENTOR.*
PAUL S. SMITH
BY Clarence B. DesJardins
HIS ATTORNEY

STRIP-FORMING AND FEEDING APPARATUS

Filed Feb. 26, 1949 14 Sheets-Sheet 6

INVENTOR.
PAUL S. SMITH
BY Clarence B. Desjardins
HIS ATTORNEY

April 3, 1951 P. S. SMITH 2,547,544

STRIP-FORMING AND FEEDING APPARATUS

Filed Feb. 26, 1949 14 Sheets-Sheet 7

INVENTOR.
PAUL S. SMITH
BY Clarence B. Desjardins
HIS ATTORNEY

April 3, 1951 P. S. SMITH 2,547,544

STRIP-FORMING AND FEEDING APPARATUS

Filed Feb. 26, 1949 14 Sheets-Sheet 8

INVENTOR.
PAUL S. SMITH
BY Clarence B. Desjardins
HIS ATTORNEY

INVENTOR.
PAUL S. SMITH
BY Clarence R. DesJardins
HIS ATTORNEY

April 3, 1951 P. S. SMITH 2,547,544

STRIP-FORMING AND FEEDING APPARATUS

Filed Feb. 26, 1949 14 Sheets-Sheet 10

INVENTOR.
PAUL S. SMITH
BY Clarence B. Des Jardins
HIS ATTORNEY

April 3, 1951 P. S. SMITH 2,547,544

STRIP-FORMING AND FEEDING APPARATUS

Filed Feb. 26, 1949 14 Sheets-Sheet 11

INVENTOR.

PAUL S. SMITH

BY Clarence B. Des Jardins

HIS ATTORNEY

INVENTOR.
PAUL S. SMITH
BY Clarence B. DesJardins
HIS ATTORNEY

April 3, 1951 P. S. SMITH 2,547,544

STRIP-FORMING AND FEEDING APPARATUS

Filed Feb. 26, 1949 14 Sheets-Sheet 13

INVENTOR.
PAUL S. SMITH
BY Clarence B. DesJardins
HIS ATTORNEY

April 3, 1951 P. S. SMITH 2,547,544

STRIP-FORMING AND FEEDING APPARATUS

Filed Feb. 26, 1949 14 Sheets-Sheet 14

INVENTOR.

PAUL S. SMITH

BY Clarence B. DesJardins

HIS ATTORNEY

Patented Apr. 3, 1951 2,547,544

UNITED STATES PATENT OFFICE 2,547,544

STRIP-FORMING AND FEEDING APPARATUS

Paul S. Smith, Carlisle, Pa., assignor to C. H. Masland & Sons, Inc., Carlisle, Pa., a corporation of Pennsylvania Application February 26, 1949, Serial No. 78,651

43 Claims. (Cl. 164—48)

My invention relates to an improved strip-forming and feeding apparatus and has to do, more particularly, with a machine for continuously forming a supply of chipboard strips of predetermined lengths and widths and feeding these strips without interruption to a magazine from which they are used in an apparatus for making pile fabric.

Such apparatus is shown in United States Letters Patent No. 2,302,722, for Apparatus For Making Cemented Pile Fabric, patented November 24, 1942, on my application, and in my pending application for Apparatus For Making Cemented Pile Fabric, Serial No. 691,795, filed August 20, 1946, now Patent No. 2,497,330, issued February 14, 1950. The machines illustrated in that patent and application make use of severable separator strips, which may be of chipboard or like material, and which must be of predetermined width and length.

Strip-forming and feeding apparatus for such machines is disclosed in my copending application Serial No. 13,303, filed March 5, 1948, now Patent No. 2,514,611, issued July 11, 1950, wherein a reel, having a plurality of coils of tape material wound thereon side by side for rotation about a common horizontal axis, is mounted at each end of a horizontal table along which the tapes are drawn alternately from each reel and are condensed into bundle form. In that application, a carriage, provided with gripping jaws, is moved, at intervals from left to right and from right to left, to draw a bundle of tapes along the table. At the end of each movement of the carriage, either from left to right or right to left, the formed bundle just drawn along the table is gripped near the cutting point and severed. The bundle of strips so severed is thereafter gripped by a plurality of fingers, which project through slots in the table, and is advanced into and maintained in pressure contact with an accumulated mass of strips formed by previously severed bundles. The carriage then grips and draws along the table in the opposite direction a tape bundle fed from the other tape supply reel at the opposite end of the table, which bundle is subjected to the operations above described with respect to the tape bundle from the first mentioned tape supply reel. The resulting strips, which have been severed, are advanced continuously under pressure to the apparatus in which the individual strips are to be utilized, the action being automatic and continuous until the supply of tape or chipboard on one or the other of the supply reels is exhausted.

In using the apparatus shown in said copending application, Serial No. 13,303, considerable time is required to remove the exhausted reel; to replace it by a full new reel; to thrust the strips into the apparatus and form the first bundle from each full new reel; and to position the first bundle in the apparatus so it will be drawn along the table. Each time a reel is replaced, the strip-forming apparatus must be shut down. The idle periods, which occur several times an hour, so limit the production of the strip-forming apparatus that the cemented pile fabric machine must also be shut down at frequent intervals. This causes an interruption of the operation of apparatus used in the manufacture of cemented pile fabric, such as is shown in United States Patents Nos. 2,050,740, 2,051,010, 2,051,011, 2,302,722, 2,312,129, 2,351,131 and 2,366,364. Each interruption in the operation of the machine inevitably produces a visible defect in the product.

The principal object of this invention is to provide a strip-forming and feeding apparatus or machine which may be operated continuously. In accomplishing this object, a major feature of this invention resides in providing two reels of strip material, at each end of the machine, with mechanism for feeding chipboard from one of the supply reels at each end while the others are being made ready for subsequent use when the supply of either of the first two reels is exhausted. The two supply reels are preferably arranged one above the other so that there will be an upper and lower tape supply reel at each end of the machine.

Another object of my invention is to provide a projection mechanism to facilitate and expedite the introduction of material from a full new reel of strips when either the upper or lower reel on the reel stand is exhausted. One reel is being replaced on the reel stand ready for use when the other reel is supplying strips so that there will be no interruption in changing from one supply reel on the reel stand to the other.

Another object of my invention is to provide for the removal of the butt end of a bundle of strips from an exhausted supply reel at the point of severing, and the introduction, at the same point, of a previously prepared or condensed bundle of tapes from a new reel supply.

Another object of my invention is to provide driving apparatus for moving the carriage with more accurate control to precisely position on the table that portion of the tape bundle which is to be severed into a strip bundle. This may be accomplished by a reciprocating carriage driven by a reversible hydraulic motor.

Accordingly, this invention lies in the provision of a pair of supply reels at each end of the machine, with a device for selectively introducing tapes from either of said supply reels and transferring from one supply reel to the other without interruption of machine operation.

Further objects, and objects relating to details of construction and economies of operation, will definitely appear from the detailed description to follow. My invention is clearly defined and pointed out in the appended claims. A structure constituting a preferred embodiment of my invention is illustrated in the accompanying drawings, forming a part of this specification, in which:

Figs. 1 and 1*a*, taken together, constitute a top plan view of the apparatus embodying the invention.

Fig. 2 is a view in side elevation of one end of the apparatus, taken along the line 2—2 of Fig. 1.

Fig. 2*a* is a view in side elevation of the other end of the apparatus, partly in section, taken along the line 2*a*—2*a* of Fig. 1*a*.

Fig. 2*b* is a detail elevation view, with some parts broken away, of the rocker device for temporarily lifting certain of the feed-rolls.

Figure 17:
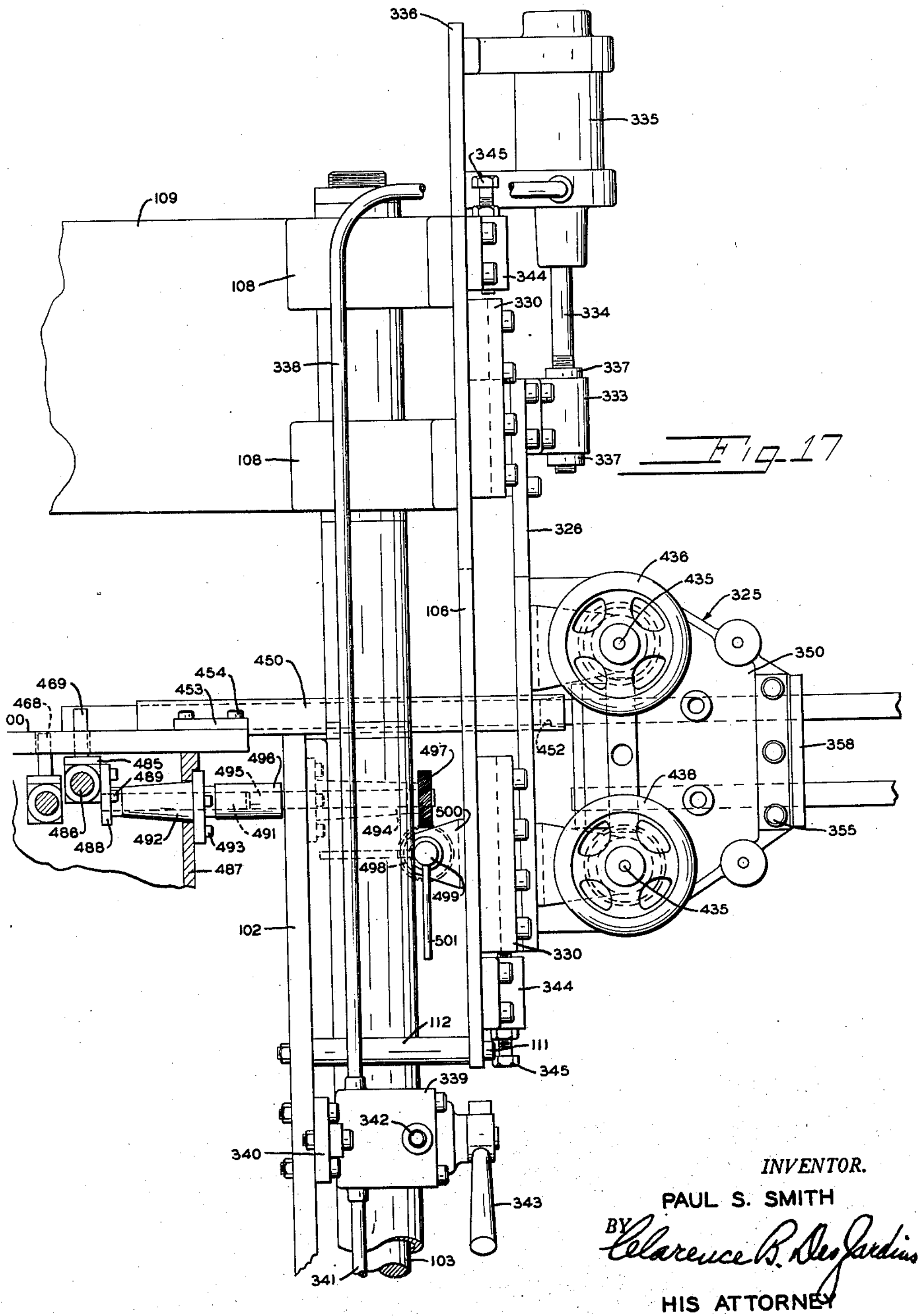
Fig. 17 is a view in side elevation of the mechanism in Fig. 13, with the projection mechanism lowered to align its upper chute with the table chute.
Figure 17A:
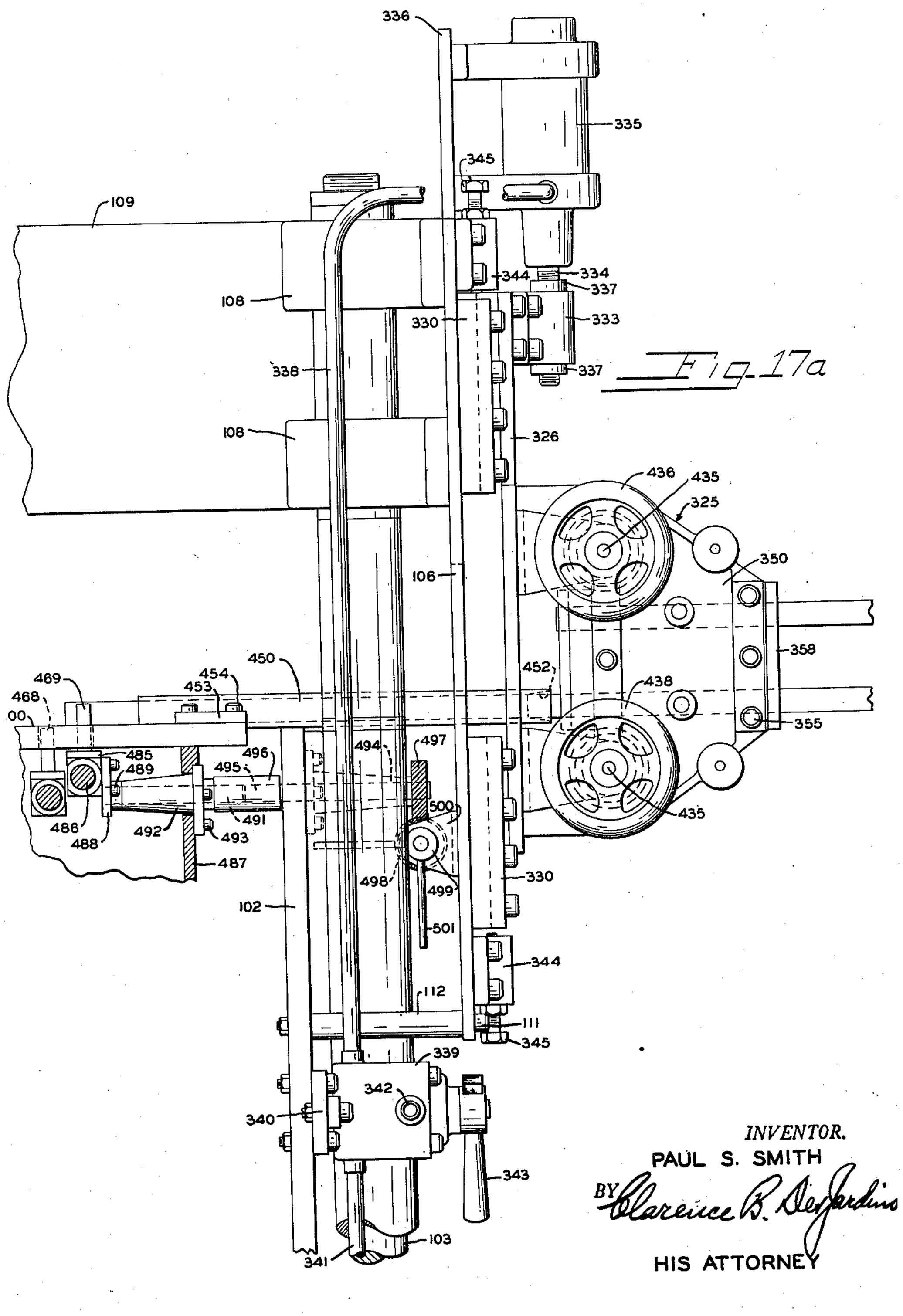

Fig. 17*a* is like Fig. 17 but with the projection mechanism raised to align its lower chute with the table chute.

Figure 18:
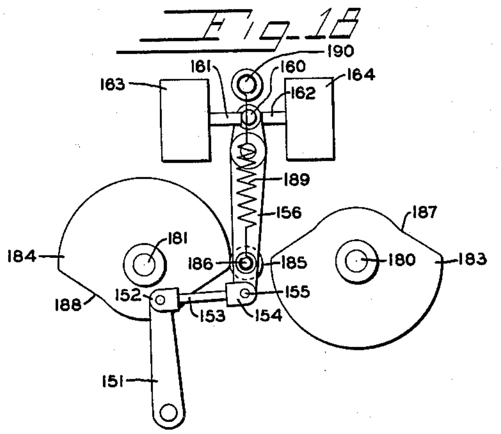

Fig. 18 is a view showing the cams for controlling the speed of the carriage in the position they occupy when the carriage is at one end of the table and the lever device has been shifted by one of the solenoids to cooperate with one of the cams.

Figure 19:
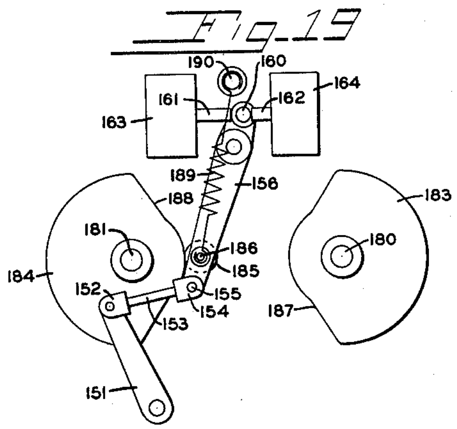

Fig. 19 is a view of the cams when the carriage has reached the middle of the table in its travel from left to right.

Figure 20:
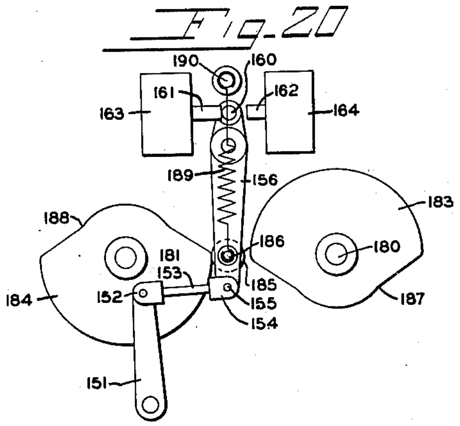

Fig. 20 is a view of the cams in the position they occupy when the carriage has reached the right end of the table.

Figure 21:
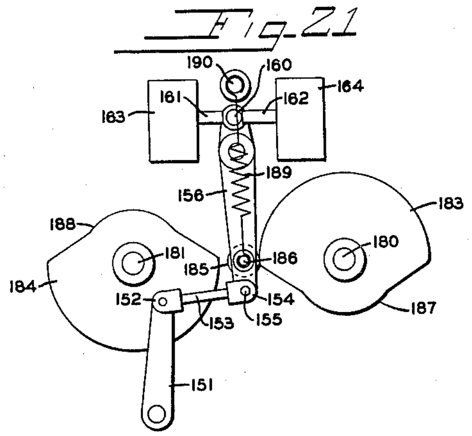

Fig. 21 is a view showing the cams in the same position as in Fig. 20 but at that point in the cycle of operation when the opposite solenoid has just shifted the lever to engage the opposite cam and reverse the hydraulic drive.

Figure 22:
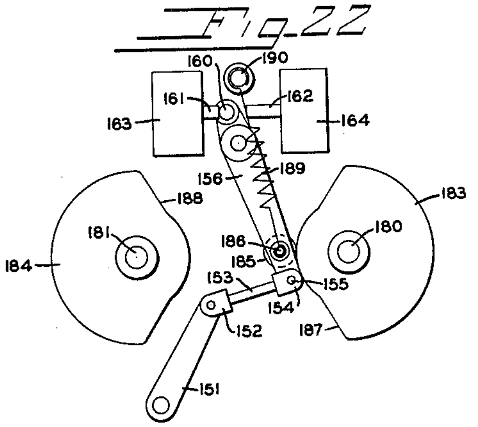

Fig. 22 is a view of the cams when the carriage has reached the middle of the table in its travel from right to left.

Figure 23:
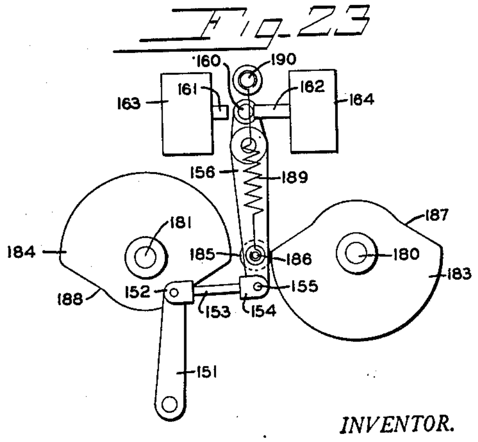

Fig. 23 is a view of the cams in the position they occupy when the carriage has reached the left end of the table.

Figures 2, 2B:
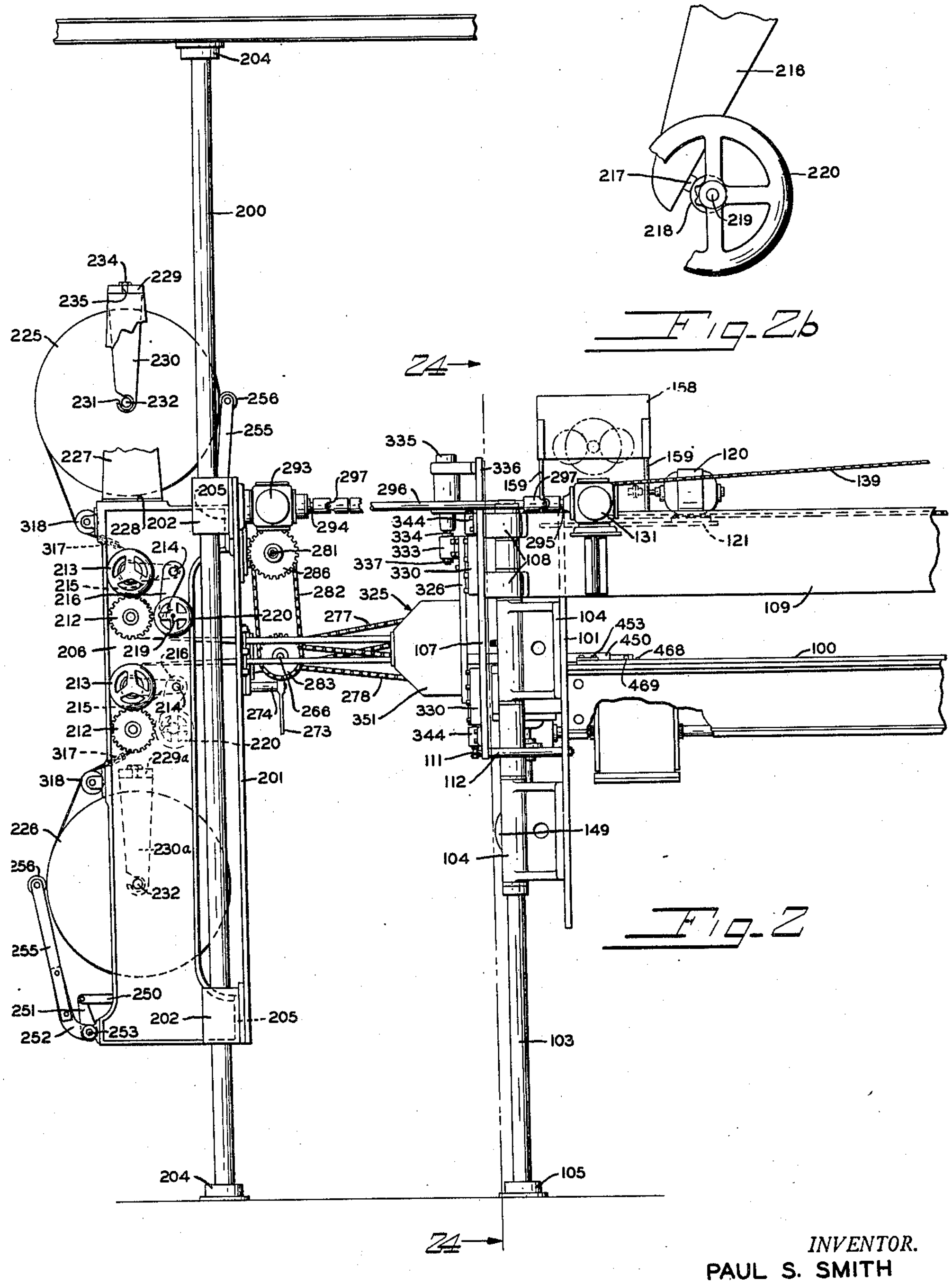
Figure 24:
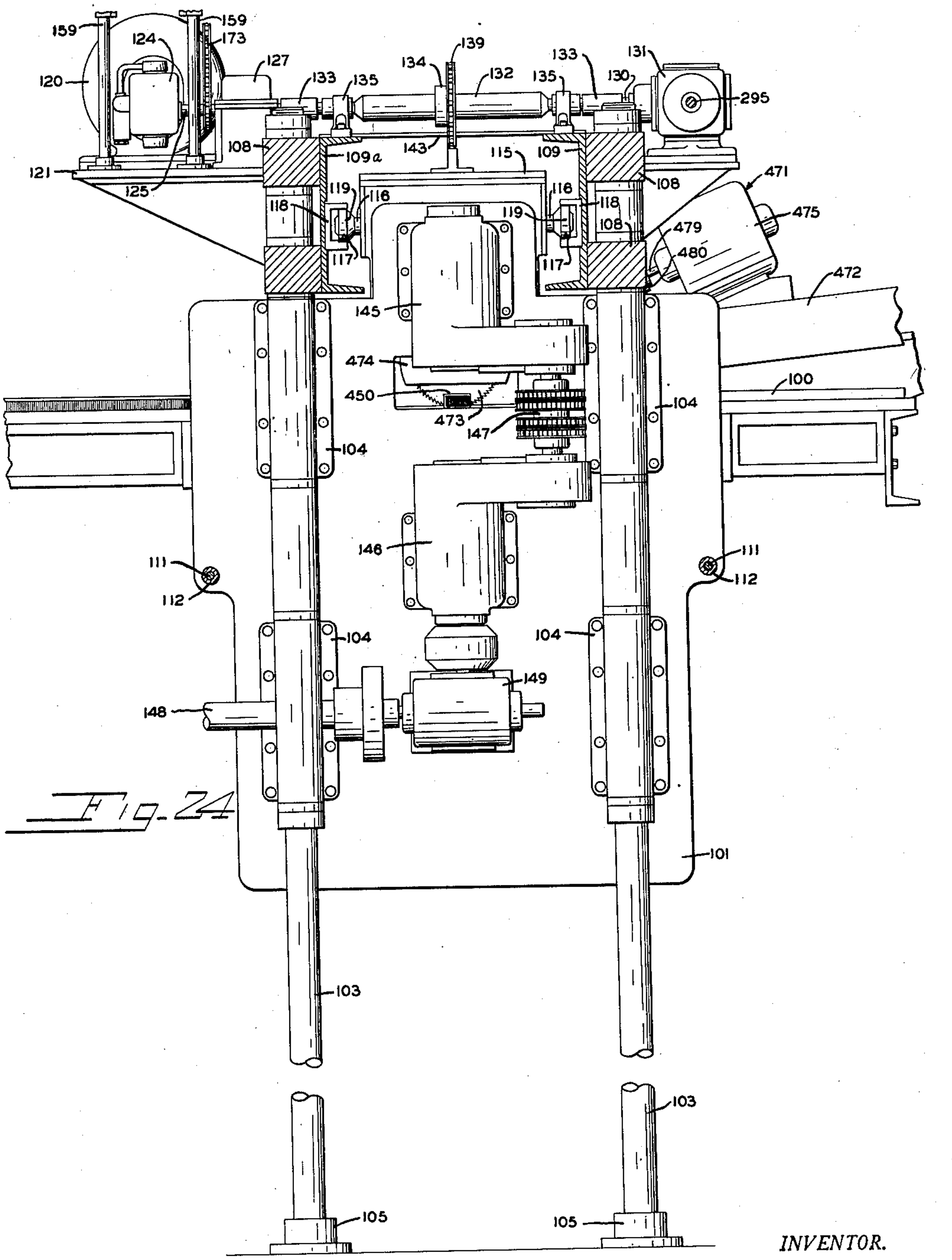

Fig. 24 is a sectional view taken on the lines 24—24 of Fig. 2.

In the drawings, the same reference numerals refer to the same parts throughout the several views, and the sectional views are taken looking in the direction of the arrows at the ends of the section lines.

In general, the strip-forming and feeding apparatus of my invention comprises a suitably supported table, and a support adjacent each end of the table, on each of which is supported a plurality of reels, each carrying a plurality of coils of chipboard tape mounted thereon. A projection mechanism is provided at each end of the machine for gathering the tapes from the coils of each reel into a compact tape bundle, in which all of the tapes have been turned through a 90° angle, by being first drawn through a reed, and disposed edgewise with reference to the plane of the surface of the table. A carriage, operated by suitable hydraulic drive mechanism, draws a tape bundle lengthwise of the table, alternately from supply reels at opposite ends of the table, and a saw operates to sever a portion of the tape bundle to form a strip bundle. The carriage has bundle-gripping jaws, which are caused automatically to grip and release a tape bundle at predetermined points in the cycle of operation, and which are raised and lowered at predetermined points of the cycle. The carriage jaws grip the end of a tape bundle that is fed on the table by a projection device and move it along the table in position for a strip bundle to be severed therefrom. The apparatus may include also a pair of outer table jaws for gripping the end of the tape bundle and holding it stationary during certain portions of the cycle of operation. These outer table jaws are so controlled that they release the tape bundle, while it is being gripped and drawn along the table by the gripping jaws on the carriage, and grip it during the return movement of the carriage until the bundle gripping jaws on the carriage have again gripped the tape bundle. The apparatus will also include a pair of inner table jaws mounted adjacent the outer table jaws and controlled so that both the outer and inner jaws will grip the tape bundle while a saw severs a portion of the tape bundle to form a strip bundle. The saw is disposed to be automatically operated to sever a strip bundle from the tape bundle along a line between the inner and outer table jaws and while the tape bundle is gripped by both the inner and outer table jaws.

Two tape supply reels are provided at each end of the table, and for each reel, I provide a pair of rolls for drawing the tapes from such reel through lease bars. The lease bars are advantageous in assuring separation of adjacent tapes at any places where they may not have been completely severed in slitting the coil of tapes from a single sheet. The lease bars also prevent the tapes from overlapping.

A projection mechanism gathers the tapes from each draw roll pair into a tape bundle after the tapes pass through a reed device for arranging them edgewise with respect to the plane of the surface of the table. The projection mechanism feeds a bundle of tapes from one of the reels in position whereby the table jaws may grip said bundle preparatory to its being gripped by the carriage jaws and drawn along the table for being cut off into a strip bundle. There is a projection mechanism at each end of the machine. Each projection mechanism may advantageously have a pair of chutes for receiving tape bundles from the supply reels. When tapes are being supplied from one reel, through one chute of the projection mechanism, tapes from the other reel may be threaded into the machine through the second chute of the projection mechanism. When the tapes are exhausted from one reel, the projection mechanism may be shifted so the tapes from the second reel, threaded through the second chute, may be fed to the carriage jaws and drawn along the table without interruption of the operation of the machine in shifting from one tape supply reel to another. The projection mechanism provides for continuous feed of tapes to the strip forming machine. The tapes in being unwound from the supply reels are preferably passed through a plurality of lease bars to separate adjacent tapes and prevent them from overlapping. A reed and a set of lease bars are provided for each reel, and both are placed in position for the tapes to pass therethrough in being drawn from the reel into the projection device.

The carriage device is moved along the table at variable speeds, starting at zero, progressively accelerating to a maximum speed midway of its travel along the table, and then progressively decelerating from the maximum speed to zero upon completion of its travel at the end of the table. The carriage is stopped at the end of the table, by a stop or bumper, when its speed has been reduced to near zero by the hydraulic drive. This progressive accelerated movement, from zero, of the carriage, which has a very substantial inertia, as it moves away from one end of the table, corresponds with the progressive accelerated movement of the tape supply reel in getting the tapes in motion not withstanding the substantial friction of the lease bars, the reed, and the chutes. Since the driving effect of the draw rolls for the tape supply reels and the projector feed rolls, as well as the holding power of the carriage jaws, is limited, a sudden or quick start would pull the bundle free from the carriage jaws. Progressive decelerated movement of the carriage from its maximum speed midway of the table to near zero as it approaches the opposite end of the table, before contacting the bumper or stop, avoids mechanical shock to the carriage and prevents the tape supply from overrunning. It also lessens the problem of overcoming the inertia of the carriage, so that the carriage will immediately stop, without shock, when it reaches the bumper and properly position the tape bundle for cutting off a strip bundle of uniform length. The hydraulic drive exerts sufficient force to hold the carriage against the bumper or stop until the hydraulic drive is reversed to move the carriage toward the opposite end of the table. The bumper or stop fixes a definite limit for the travel of the carriage, so that all of the tape bundles will be cut into strip bundles of equal length.

The machine for making cemented pile fabric shown in the above-mentioned patents and applications, employs two magazines, one on each side of the machine. The apparatus shown in the present application is for the purpose of supplying strips to one of these magazines only. A like apparatus will be provided for feeding strips to the other magazine.

Referring specifically to the drawings, the machine has a rectangular table 100 (Figs. 1 and 1*a*) extending horizontally between opposite end plates 101 and 102 which are in turn mounted upon vertical posts 103 by any suitable means, such as brackets 104. The opposite ends of the posts are provided with flanged feet 105 for being secured to some fixed members, such as the floor and ceiling of a building. Additional end plates 106 and 107 are also attached to the posts 103 by means of brackets 108 which also support channel beams 109 and 109*a* that extend between the end plates 106 and 107. Bolts 111 and spacer sleeves 112 hold plates 106 and 107 in proper spacing with respect to end plates 101 and 102.

The tapes are supplied from supply reels which are mounted on a reel support adjacent each end of the table, gathered into a tape bundle, and drawn along the top of the table so that the end portion, which is drawn along the table, can be cut off into a strip bundle of certain length, and then moved to the magazine of the cemented pile fabric machine. A tape bundle is first drawn from a supply reel at one end of the table to have a portion cut off into a strip bundle, and then another tape bundle is drawn from a supply reel at the opposite end of the table. The means for drawing the tapes along the table is designated a carriage, and this means traverses back and forth the length of the table, each time carrying the tape bundle from that end of the table away from which it is moving to the opposite end.

*The carriage*

A carriage 115 of hollow box-like construction (Fig. 1*a*) is provided with projecting studs 116 on opposite sides for riding in channels 117 (Fig. 2*a*) of channel bars 118. There preferably are two of these studs on each side of the carriage, and each of the studs is advantageously mounted in a roller bearing 119 (Fig. 24) of conventional construction with an inner and outer raceway. The outer raceways of bearings 119 roll in the channels 117 of the channel bars 118, which are attached to the channel beams 109 and 109*a*.

The carriage may be of the construction described in my application Serial No. 13,303, which has suitable means for being actuated automatically, at certain time intervals in the cycle of operation of the machine, to grip the tape bundle, draw the bundle while so gripped along the table, and then to release the grip on the tape bundle after the drawn portion has been severed into a strip bundle. In the instant case, however, the carriage is so driven and brought to a stop at the end of the table for uniform lengths of the tape bundles to be drawn along the table and positioned for severance into strip bundles of uniform lengths.

*Carriage driving mechanism*

Figure 15:
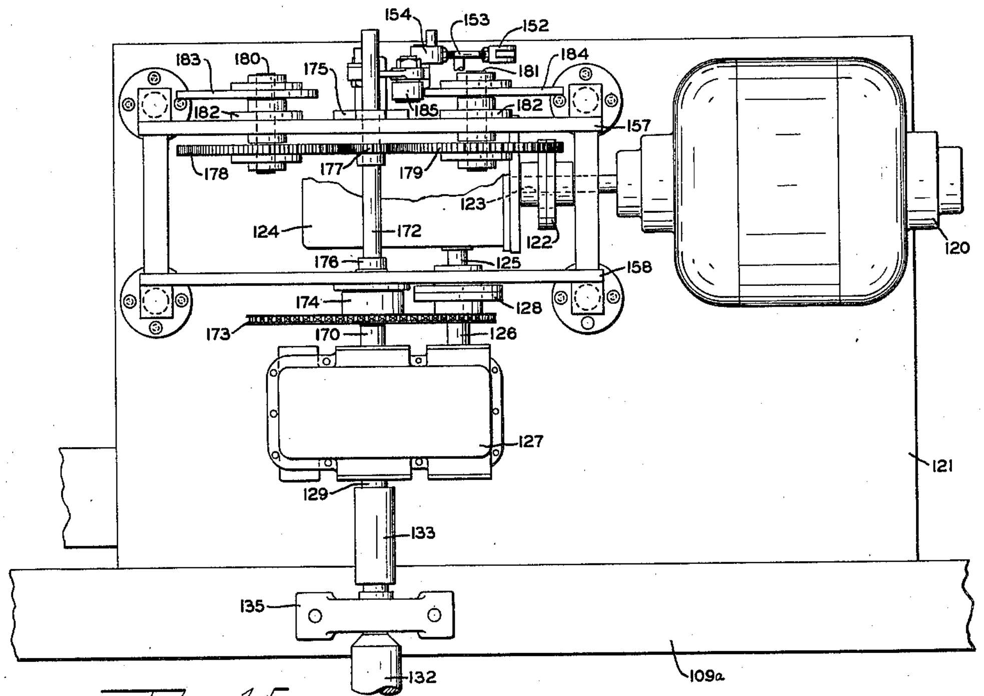
Fig. 15 is a plan view of the hydraulic drive mechanism.

The carriage 115 is moved from right to left and from left to right on the channel bars 118 by power supplied, through hydraulic driving mechanism, from an electric motor 120, mounted on a base plate 121 that is attached to the outer side of the channel beam 109a. The electric motor 120 is connected by a flanged coupling 122 to the shaft 123 of an hydraulic drive unit 124 (Fig. 15). An output shaft 125 of the hydraulic drive unit 124 is connected to an input shaft 126 of a reduction gear unit 127 by a flanged coupling 128. The reduction gear unit 127, which is mounted on the base plate 121, is provided with an output shaft 129 that is connected to the end of an input shaft 130 of a miter-gear unit 131 (Fig. 1) by means of an intermediate driving shaft 132. This intermediate driving shaft is coupled at its opposite ends to respective shafts 129 and 130 by couplings 133, and is journaled in bearing brackets 135 which are supported on channel beams 109 and 109a. A driving sprocket 134 is fixed to the drive shaft 132.

On the opposite end of the apparatus, a drive shaft 136 (Fig. 1a), similar to shaft 132, is journaled in bearing brackets 137, also mounted on the channel beams 109 and 109a. These shafts 132 and 136 are disposed in parallel relation. A driven sprocket 138 is fixed to shaft 136 in alignment with sprocket 134 on shaft 132. A sprocket chain 139, having its opposite ends attached at 140 (Fig. 2a) to the carriage 115, is passed over the two sprockets 134 and 138 and is actuated thereby to reciprocate the carriage along the length of the table as above described. An idler sprocket 141 may be advantageously supported on brackets 142, and may be adjusted vertically to tension the sprocket chain 139. The brackets 142 in turn are fixed to any suitable support that is attached to some fixed part, such as a cross piece 143 between channel beams 109 and 109a.

The carriage is provided with mechanism, hereinafter described, for gripping the tape bundles, and this mechanism comprises a splined shaft 144 extending through the carriage and journaled in end plates 101 and 102. One end of this splined shaft, beyond end plate 101, is rotatably driven by gear drive mechanism, within casings 145 and 146 (Fig. 24). There is an adjustable coupling 147 between the gearing in casings 145 and 146, which coupling is offset so that room is allowed for feeding the tape bundle to the end of the table. The gear drive mechanism is driven by the main drive shaft 148, coupled to the main drive shaft of the apparatus for making cemented pile fabric. A conventional gear reduction unit 149 is employed between this main shaft 148 and the adjacent gear drive mechanism in casing 146.

*Hydraulic drive unit*

Figure 16:
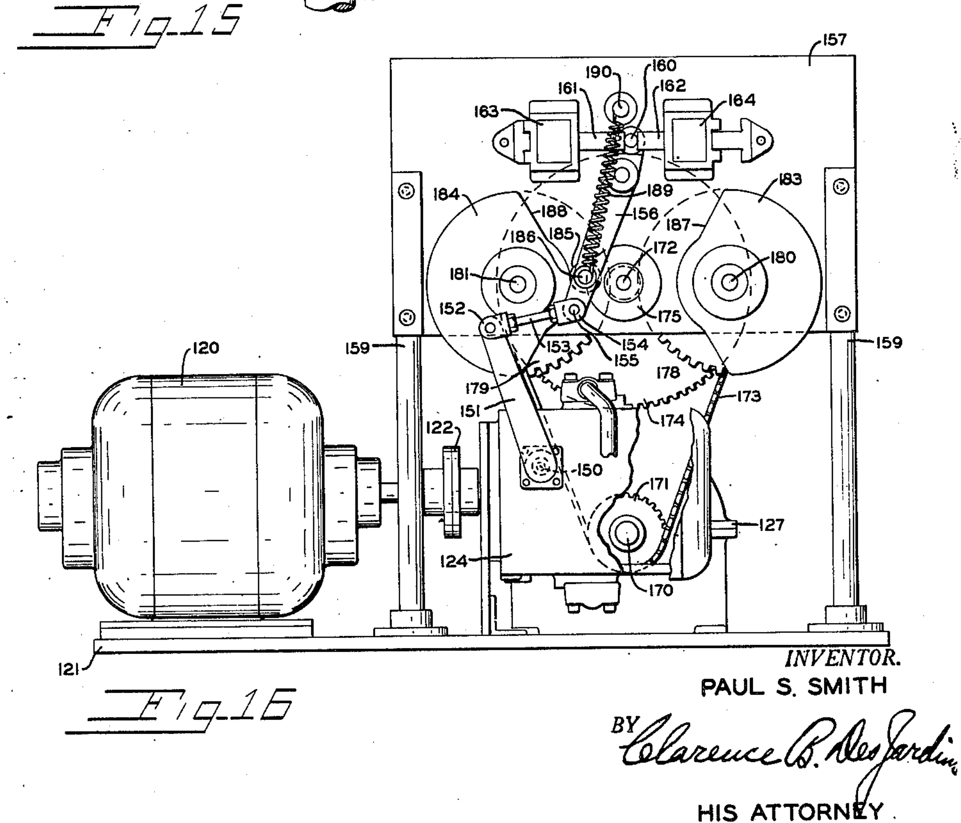
Fig. 16 is an elevation view taken from the rear of Fig. 15.

The hydraulic drive unit 124 is reversible for actuating the carriage drive sprocket mechanism in either of its two directions of movement, the reversing of the hydraulic drive unit being effected by its control shaft 150 (Fig. 16), which is angularly displaced, for causing the output shaft 125 to be rotated clockwise or counterclockwise, by a lever 151 pivotally connected to clevis 152 of the adjustable link 153. The clevis 154 on the opposite end of link 153 is pivotally connected at 155 to another lever arm 156 which is pivoted to the mounting plate 157, one of two plates mounted on vertical standards 159 on the base 121. There is a duplicate mounting plate 158 disposed in parallel relation to mounting plate 157. The opposite end of the lever 156 has a lug 160 disposed between two plungers 161 and 162 of the respective solenoids 163 and 164. These solenoids are selectively energized, at certain points in the cycle of operation, from the multiple cam switch 165 to move the lever unit for angularly displacing the control shaft of the hydraulic drive unit to rotate the output shaft either clockwise or counterclockwise as desired, and at the desired speed of rotation. One solenoid is energized to move the lever in one direction, and the other solenoid is energized to move the lever in the opposite direction. Thus, the output shaft of the hydraulic drive unit is reversed at proper intervals to reverse the travel of the carriage.

A suitable reversible hydraulic drive unit is a "Vickers Self-Contained Variable Speed Transmission" which is manufactured and sold by Vickers, Incorporated, of Detroit, Michigan. The said unit is automatically controlled by angular displacement of the control shaft to the left or right of zero or neutral to cause the output shaft to be turned clockwise or counterclockwise. The speed of rotation of the output shaft is increased in proportion to the angular displacement of the control shaft in either direction from zero or neutral, and the speed is conversely decreased by returning the control shaft toward zero or neutral.

Another output shaft 170 (Fig. 15) extends from the reduction gear unit 127, on the side opposite to output shaft 129, and has keyed thereto sprocket 171 which drives shaft 172 by means of a sprocket chain 173 between sprocket 171 and a sprocket 174 that is fixed to shaft 172. Shaft 172 is journaled in bearings 175 and 176 that are supported on the respective mounting plates 157 and 158. A pinion 177 is fixed to the shaft 172 in position to mesh with spur gears 178 and 179 which are fixed to respective shafts 180 and 181, the shafts being journaled in identical bearings 182 which are fixed on the mounting plate 157.

*Control device for reversible hydraulic drive*

A pair of cams 183 and 184 is provided, the cam 183 being keyed on the end of shaft 180 opposite to the spur gear 178 and the other cam 184 being keyed on the end of shaft 181 opposite to the spur gear 179. The cams are rotated by the respective shafts on which they are mounted, when the hydraulic drive turns shaft 170 to move the carriage.

A cam roller 185 is mounted on the lever 156 by means of pin 186 in position to have rolling contact with either of the cam faces 187 or 188 selected by shifting of the lever 156 by one of the solenoids. There is an over-center tension spring 189 having one end attached to a pin 186 on the lever 156 and the other end secured to a pin or stud 190, mounted upon the plate 157. When the lever is pushed in either direction off dead-center by one or the other of the solenoids, the spring urges the cam roller to ride upon the cam face of a selected cam. The cam faces are so shaped that the control shaft 150 will be displaced the maximum distance from neutral or zero at the intermediate portion along the cam faces and hence cause the speed of the carriage to be greatest during the intermediate portion of its travel. The control shaft of the motor pump unit will be gradually turned toward zero or neutral, and, hence, the carriage will be slowed down to near zero, as it approaches the completion of its travel to the end of the table. There is thus a continuous pull exerted upon the tape bundle to maintain it taut until the strip bundle is severed therefrom.

Stops or bumpers 191 (Figs. 1 and 1a) may be advantageously provided at some fixed points in the path of the carriage, such as on each of the end plates 106 and 107, to insure stopping of the carriage within certain set limits for depositing the tape bundle in proper alignment on the table for cutting off strip bundles of exact lengths. There are preferably two stops or bumpers on each of the end plates, one being placed in position to be adjacent the top and the other the bottom of the carriage. The stops or bumpers may advantageously be a block of any suitable yieldable material, such as rubber, cork or the like, secured to a holder that is fastened to the end plates. The stops or bumpers are so positioned on the end plates that the carriage will contact them just as it is slowed down to a stop by the reduced speed of the output shaft of the hydraulic drive unit. Thus, the impact, if any, resulting from the carriage coming in contact with the bumpers or stops, is so slight that there is no recoil or rebound. The carriage is gently pushed tightly against the stops or bumpers and maintained thereagainst until the hydraulic drive unit is reversed by energizing the other solenoid. In the meantime, the tape bundle is held taut until a strip bundle has been severed therefrom.

The electric driving motor 120 runs continuously in the same direction, driving the hydraulic unit 124 for rotating its output shaft 125. When the lever 151 is in a vertical or neutral position, the control shaft 150 of the hydraulic drive unit is at zero or neutral and the output shaft of the unit is not rotating. However, as the lever 151 is moved to either side of the vertical center line, the control shaft of the hydraulic drive unit is turned away from neutral, thereby causing the output shaft 125 to rotate at a speed corresponding to the angular displacement of the control lever from neutral and in a direction corresponding to its position to right or left of neutral.

The output shaft 125 of the hydraulic pump-motor unit 124 transmits power to the reduction gear unit 127, causing shaft 132 to be rotated together with sprocket 134, driving the chain 139 and rotating the sprocket 138 on the shaft 136. The carriage 115 is thereby caused to move along the table 100. Simultaneously with the rotation of shaft 132 and sprocket 134, shaft extension 170 of the reduction gear unit 127 also rotates the sprocket 171, driving the chain 173, rotating the sprocket 174, the pinion 177 and gears 178 and 179, shafts 180 and 181, and the cams 183 and 184. The fixed diameters of sprockets 134 and 138 and the reduction ratio of the reduction gear unit 127, the fixed diameters of sprockets 171 and 174, and the ratio between the pinion 177 and gears 178 and 179 are so interrelated that movement of the carriage 115 from its position of rest at one end of the table 100, to a corresponding position of rest at the opposite end of the table, produces a rotation of exactly 180° of the cams 183 and 184.

Figs. 18 and 23 show the positions occupied by cams 183 and 184 when the carriage is at rest against the stops at the left end of the table, Figs. 20 and 21 show the positions of the cams when the carriage is at rest at the right end of the table and Figs. 19 and 22 show the positions of the cams when the carriage is in a position midway of the table. Assuming that the carriage is at rest against the stops at the left end of the table, the parts will occupy the positions shown in Fig. 23 and spring 189 holds roller 185 against cam 183, so that lever 151 is to the right of neutral and the hydraulic drive tends to move the carriage to the left against the stops 191, which prevent such movement. At the proper point in the cycle, multiple switch 165 completes an electrical circuit to energize solenoid 163, which shifts lever 156 to the position shown in Fig. 18, in which spring 189 holds roller 185 against cam 184. This shift of lever 156 reverses the direction of rotation of the output shaft of the hydraulic drive unit, so that the carriage starts to move away from the left end toward the right end of the table and cam 184 starts to turn counterclockwise. The shape of cam 184 is such that the initial carriage speed is low since the displacement of lever 151 to left of neutral is small. However, as the carriage continues to move to the right and cam 184 continues to turn counterclockwise, the contour of the cam permits spring 189 to shift gradually the lower end of lever 156, and lever 151, further to left of neutral, thus gradually increasing the speed of carriage travel until, at the midpoint, the parts occupy the maximum speed position of Fig. 19. Continued movement of the carriage to the right, and continued counterclockwise rotation of cam 184, results in a gradual shifting of lever 151 toward neutral position and a consequent slowing down of the carriage until it contacts the stops at the right end of the table, when the parts occupy the positions shown in Fig. 20. In this position, the hydraulic drive tends to move the carriage further to the right but cannot because of its engagement with the stops and, hence, the carriage and cams 183 and 184 remain at rest until the drive is reversed. After a suitable dwell of the carriage at the right end of the table, switch 165 energizes solenoid 164, which moves levers 156 and 151 to the right of neutral to the positions shown in Fig. 21. This reverses the direction of rotation of the output shaft of the hydraulic drive, so that the carriage starts to move slowly from right to left and cam 183 starts to turn clockwise. As the carriage moves to the left its speed gradually increases, because the contour of cam 183 permits a further displacement of lever 151 to the right of neutral, until the maximum speed is reached at the midpoint of the carriage travel, and the parts are in the position shown in Fig. 22. Further travel of the carriage to the left causes the carriage to slow down until it reaches the left hand terminal position against the stops, and the parts are in the position shown in Fig. 23. The hydraulic drive tends to move the carriage in a direction to hold it against the left hand stops until, after a suitable dwell, switch 165 energizes solenoid 163 to shift the parts to the positions shown in Fig. 18. The cycle of movement is then repeated, as described. During the period of dwell, at each end of the table, the tape bundle is severed to form a strip bundle and, since, at this time, the hydraulic drive holds the carriage against the limiting stops, the carriage is accurately positioned when the tape bundles are severed and the strip bundles formed are of uniform length.

*Reel stands*

There are two reel stands for each table, one located at each end of the table. Each reel stand consists of two vertical posts 200 supporting a mounting plate 201 fixed thereon by means such as blocks 202. The posts 200 are attached to the floor at one end and to an overhead building girder at the other end by means of flanged fittings 204. Also attached to each mounting plate 201 by means of feet 205, are frame members 206, two of the frame members 206 being provided for each of the reel stands.

Figure 4:
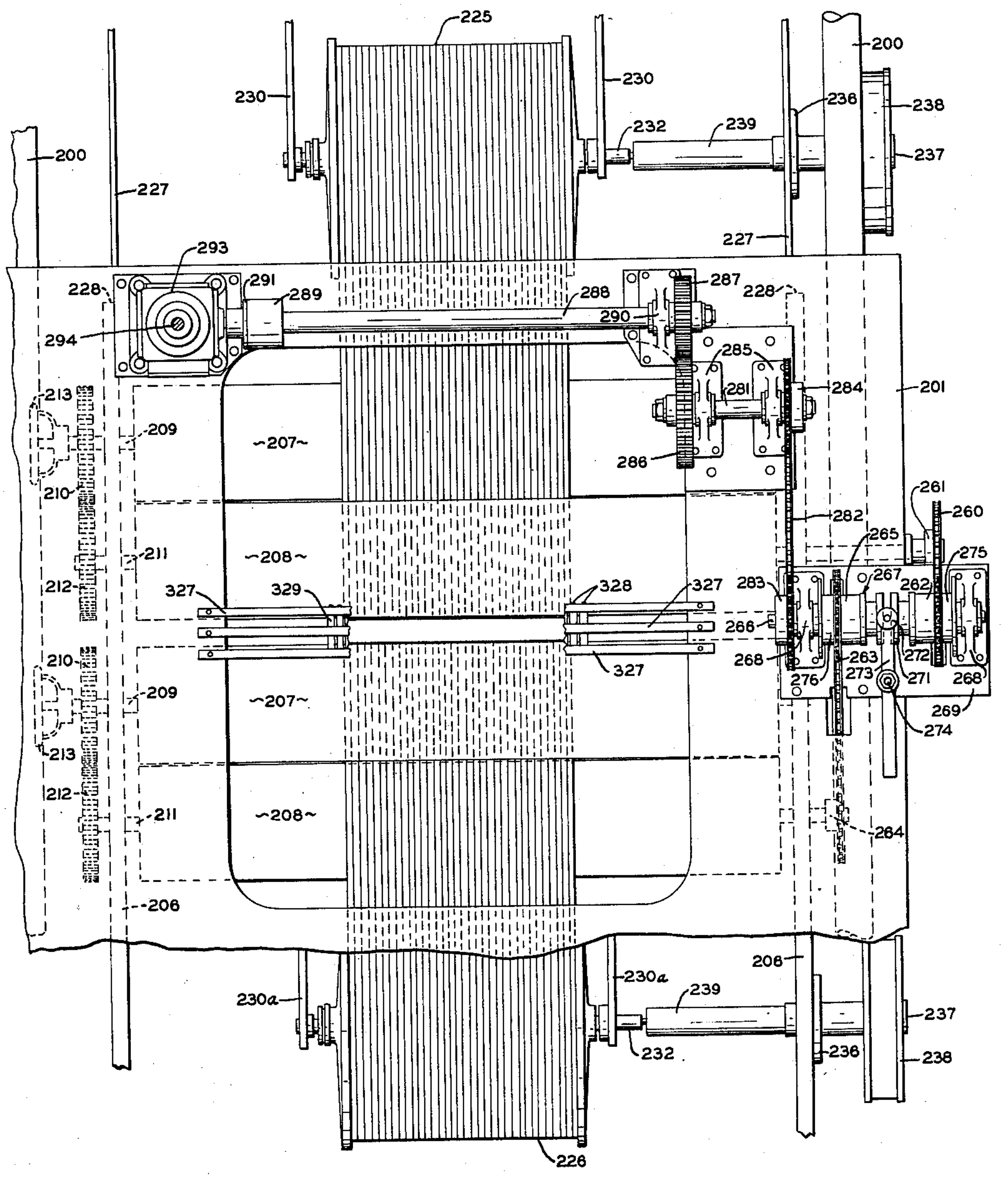
Fig. 4 is a view taken along the line 4—4 of Fig. 1.

The frame members 206 have two sets of draw rolls journaled therein, one set for each reel for drawing the tapes from the supply coils which are mounted thereon. Means are provided with each set of draw rolls for moving one draw roll thereof in relation to the other roll. The two sets of draw rolls are identical; thus description of one set is applicable to the other set. The sets may be referred to generally as the upper and lower draw rolls or draw roll pair. Each set of draw rolls comprises two rubber surfaced rolls 207 and 208 (Fig. 4), of which roll 207 is journaled in movable arms hereinafter described, and roll 208 is journaled in the frame members 206. The gudgeon 209 is provided to extend from one end of the feed roll 207 to have a spur gear 210 fixed thereon. The other roll 208, which is journaled in the frame members 206, also has an extended gudgeon 211 on which is fixed a spur gear 212, meshing with the spur gear 210 on the gudgeon of roll 207 when the rolls 207 and 208 contact. A hand wheel 213 is fixed on the end of the gudgeon 209 of roll 207 to permit said roll being turned by the operator. This latter draw roll 207 has a rocker device connected therewith for moving same relatively to draw roll 208, this rocker device comprising a shaft 214 to which the respective ends of arms 215 and 216 are fixedly attached. There are two arms 215, one adjacent each end of the roll 207, and the opposite ends of arms 215 receive the gudgeons 209 of the draw roll 207 for rotatably supporting said roll therein. The opposite end of arm 216, is provided with a lug 217 to be engaged by a cam surface 218 on the sleeve 219, rotatably mounted on a stud attached to a frame member 206, and provided with a hand wheel 220. The hand wheel 220 is manipulated to move the draw roll 207, by means of the lug and cam, toward and away from the other draw roll 208. Thus the ends of the tapes from a supply reel may be readily inserted between the draw rolls, and the rolls may be held apart whenever the machine is idle.

These draw rolls 207 and 208 are for receiving tapes from supply reels 225 and 226, which are preferably mounted on the frame 206. One set of draw rolls is for drawing the tapes from the upper supply reel 225, and the other set of draw rolls is for drawing the tapes from the lower supply reel 226. Supply reel 225 is advantageously supported by a pair of brackets 227 which may be mounted upon the bearing surfaces 228 of the frames 206. These two brackets 227 are spaced apart and are joined at their top ends by a cross piece 229. This cross piece has two suspended arms 230 attached thereto, with the free ends of said suspended arms provided with inclined openings 231 into which the mandrel 232 of the supply reel, on which the coils of tape are wound, may be inserted and rotatably mounted. The top ends of the suspended arms 230 are advantageously attached to the cross piece 229 by angle pieces 233 and bolts 234, and the cross piece may be provided with an elongated slot 235 to permit horizontal adjustment of either, or both, of the suspended arms to space them apart at any desired distance to accommodate supply reels of different widths.

A bearing 236 is provided on one of the brackets 227, having journaled therein a shaft 237 on one end of which is fixed a brake drum 238. A coupling 239 connects the other end of the brake drum shaft 237 with the end of the supply reel mandrel 232. This coupling is of a length permitting it to be moved axially for engaging and disengaging the end of the mandrel of the supply reel to allow its replacement. The ends of the coupling are splined with the reel mandrel and the brake drum shaft with which they connect.

There is associated with the brake drum 238 a brake band 244, having one end 245 secured to some fixed part, such as a holder 246 on the frame member 206. The brake band partially extends around the brake drum and has its opposite end connected by an extension spring 247 to one arm of a bell crank 248, pivoted at 249 to one of the reel bracket supports 227. The other end of the bell crank is connected by means of link 250 to the end of lever 251 which is keyed at its opposite end to rocker arm 252, journaled on shaft 253. This shaft 253 may be journaled in bearings 254 which are fixed to the respective frame members. A lever arm 255 is keyed centrally of the length of the shaft 253, with its free end disposed adjacent to the reel supply, said free end of the arm carrying a follower roller 256 which engages the tapes on the supply reel to lessen the braking action of the brake drum as the supply of tapes on the reel diminishes.

The lower tape supply reel 226 is similarly mounted on arms 230*a* which are suspended from cross piece 229*a* of the frame, and it has associated therewith a braking means of the same general construction as that described for the upper tape supply reel.

A strip bundle is alternately cut from tape bundles coming from two of the tape supply reels, one at each end of the table. Therefore, the withdrawal of tapes from the reels is intermittent, and each withdrawal of tapes from a reel, to be gathered into a tape bundle and drawn along the table, has a period of deceleration, corresponding to the declining speed of the carriage, at the end of its movement along the length of the table. The braking mechanism is employed to prevent a reel from overunning during its period of deceleration. As a supply of tapes is removed from a supply reel, causing the reel to diminish in diameter, the roller 256, acting through the linkage connected to the lever arm 255, diminishes tension on the spring 247, thereby reducing the frictional effect of the brake. Less braking force is required as the supply of tape material on the reel diminishes.

After placing each reel in position on the reel stand, the coupling 239 is moved axially to connect the brake drum shaft 237 to the reel mandrel 232. Conversely the coupling is axially moved to disconnect the brake drum shaft from the reel mandrel when a reel is removed from the reel stand.

*Drive connection for draw rolls*

The upper and lower draw rolls may be advantageously driven from a common device. A sprocket chain 260 connects sprocket 261 on the gudgeon of the upper draw roll 208 to the sprocket 262, and sprocket chain 263 connects the sprocket 264 on the gudgeon of the lower draw roll 208 to the sprocket 265. The sprockets 262 and 265 are attached to the respective driven members of a dual multiple disc clutch 267. The driving shaft 266 of this dual multiple disc clutch is mounted in bearings on pedestals 268 which are secured to the mounting plate 201. A sub-assembly plate 269 and a machined pad 279 may be interposed between the pedestals and the mounting plate 201.

The clutch 267 consists of two independent units, one on each side of a central grooved shifter block 271 that is engaged by the pins 272 of a forked shifter lever 273, pivoted on a stud 274 extending from the mounting plate 201. This clutch is manipulated to selectively operate either set of draw rolls.

Sprockets 275 and 276 (Fig. 1) are attached respectively to the hubs of the sprockets 262 and 265, with respective sprocket chains 277 and 278 (Fig. 2), driven thereby for driving projection mechanism on the same end of the table, as hereinafter described. The projection mechanism comprises upper and lower drive shafts 435. The sprocket chain 277 connects sprocket 275 with sprocket 437, fast on the upper drive shaft 435, and sprocket chain 278 connects sprocket 276 with sprocket 439, fast on the lower drive shaft 435. The clutch 267 operates to select either drive shaft of the projection mechanism, as well as the corresponding draw roll set, for operation. The clutch shaft 266 is operatively connected to a countershaft 281 by means of a sprocket chain 282 between sprockets 283 and 284, the sprocket 283 being attached to the clutch shaft 266 and sprocket 284 being attached to the countershaft 281. The countershaft is journaled in bearings on pedestals 285, and has a gear 286 fast thereon and meshing with the gear 287. The gear 287 is keyed to the end of shaft 288 whose opposite end is keyed within the inner drive member of the free wheeling or overrunning clutch 289. The end of the shaft adjacent the gear is journaled on the pedestal 290 which is attached to the mounting plate 201. The outer driving member of the free wheeling clutch has a flange member 291, having a hub keyed on the output shaft 292 of the miter gear unit 293 which is mounted on the plate 201. This miter gear unit 293 has an input shaft 294 connected to the output shaft 295 of the miter gear unit 131 (Fig. 1), previously referred to, by shaft 296 which may have universal connections 297.

Figure 1:
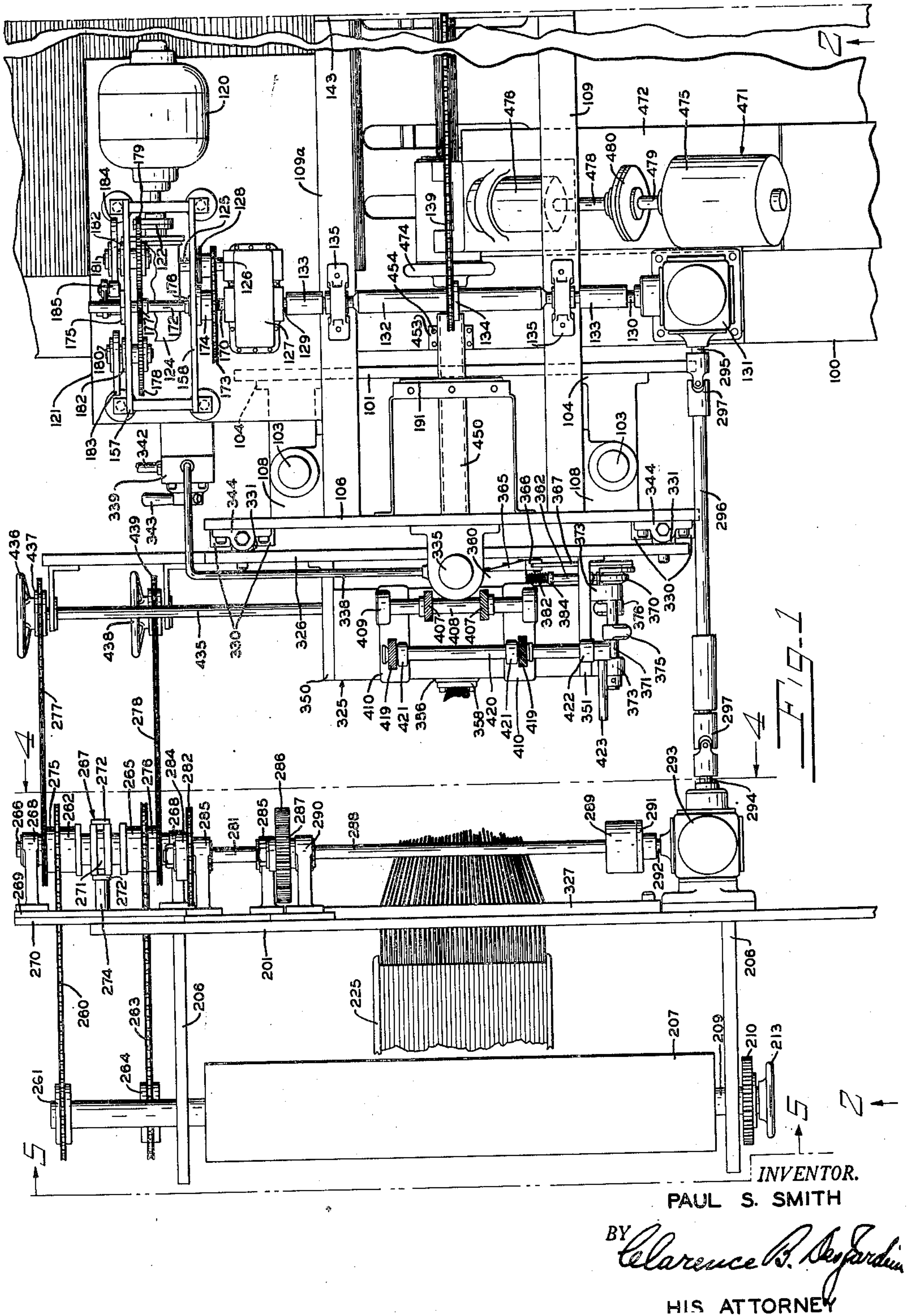
Figure 1A:
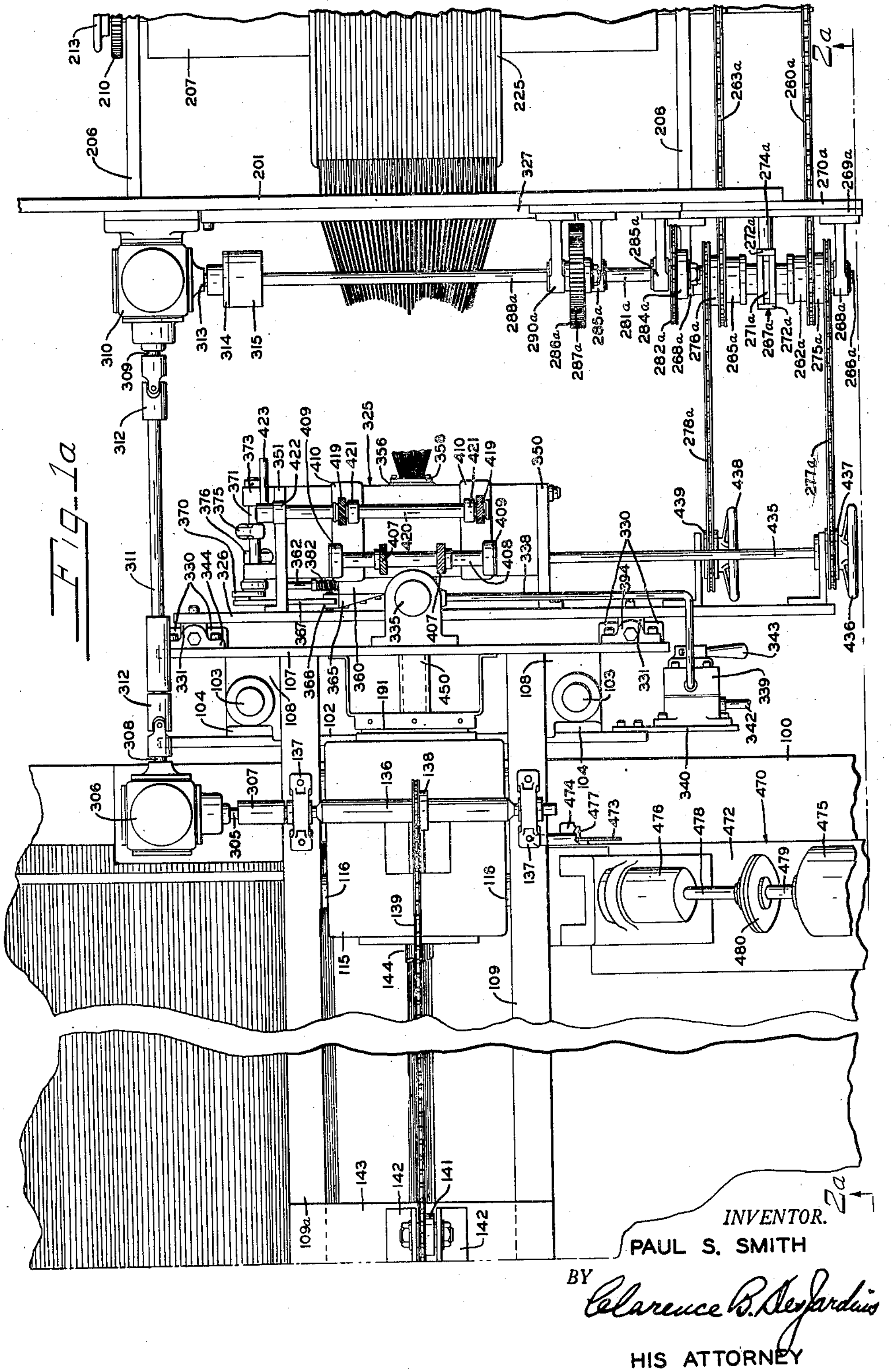
Figures 2A, 3:
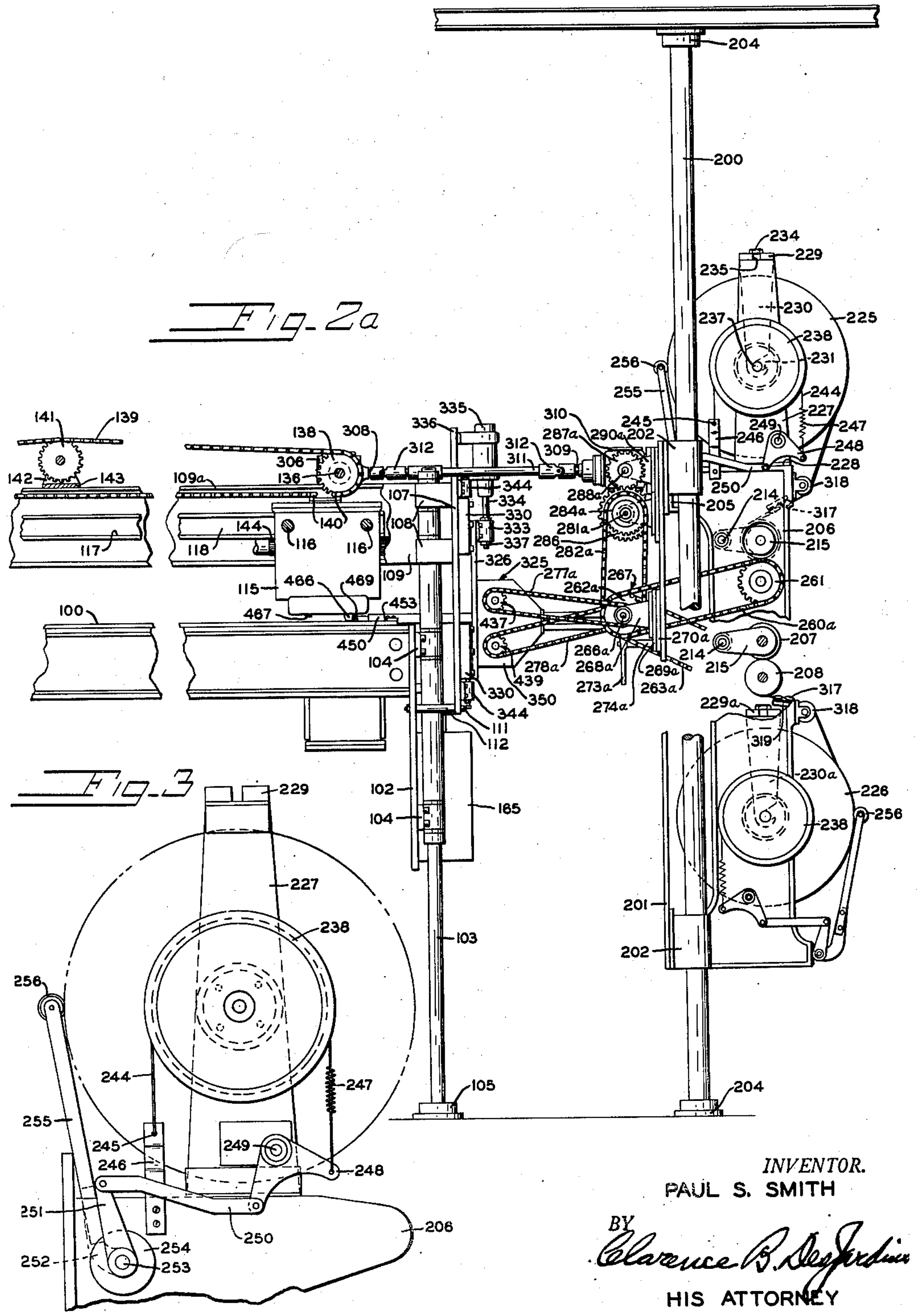
Fig. 3 is a detail view of the reel brake mechanism.

The driving connections above described from the miter gear unit 131 to the multiple disc clutch 267 are for driving the projection devices and the draw roll sets at one end of the machine. A duplicate driving connection device is provided for the projection devices and the draw roll sets at the other end of the machine, this driving connection device extending from the end of shaft 136, carrying the sprocket 138 (Fig. 1*a*). The input shaft 305 of miter gear unit 306 is coupled by a sleeve 307 to the shaft 136, and the output shaft 308 of this miter gear unit 306 is connected to the input shaft 309 of miter gear unit 310 by a shaft 311 having universal connections 312. The output shaft 313 of the miter gear unit 310 is keyed to the outer member 314 of the free wheeling clutch 315.

The mechanism between the free wheeling clutch 315 and the dual disc clutch 267*a* is a duplicate of that already described between the dual disc clutch 267 and the other free wheeling clutch 289. The parts of the duplicate mechanism need not, therefore, be described in detail but may be identified by the same reference numerals, with the letter *a* added to distinguish between the duplicate sets.

*Lease bars*

Figures 5, 6, 7:
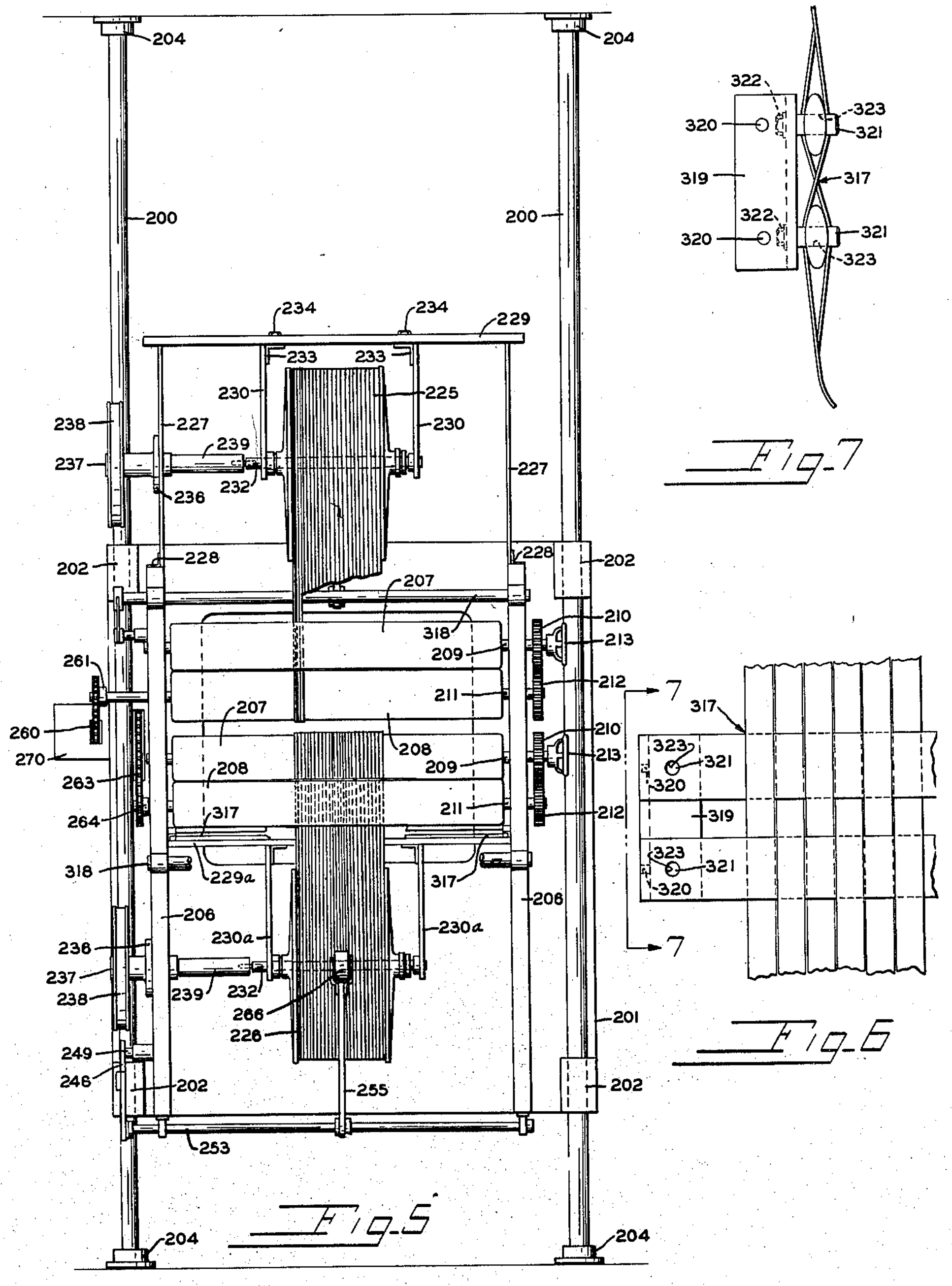
Fig. 5 is an end view of one end of the apparatus, taken along the line 5—5 of Fig. 1.
Fig. 6 is a partial view, on an enlarged scale, of the lease bars forming a part of the feeding apparatus.
Fig. 7 is a detail view taken along the line 7—7 of Fig. 6.

A pair of lease bars, indicated generally at 317, is preferably provided between each tape supply reel and its respective set of draw rolls, these bars being advantageously placed between a deflection or idler roll 318 that is journaled on the frame members 206 and the draw rolls 207 and 208 which are next adjacent to the deflection or idler roll. The tapes are threaded through the lease bars to separate and prevent them from overlapping. The lease bars are attached to the inner surfaces of the frame members 206 by means of a pair of angle plates 319, one leg of each plate seating against the adjacent frame member and secured in place thereon by suitable fastening means, such as bolts, projected through perforations 320. The other legs of the angle plates have a pair of studs 321 clamped thereto by means of nuts 322. The opposite ends of the lease bars are perforated at 323 (Fig. 6) in order for them to be fitted on the free projecting ends of the studs. The studs are vertically disposed so that the lease bars can be freely attached to and detached from them, the perforations being slightly larger in diameter than the diameter of the studs. Two lease bars are preferably provided, these being arranged in tandem and parallel to the path of the tapes in passing between the deflecting roll and the draw rolls. The lease bars are also preferably elliptical in cross section so that the tapes may pass more freely around them. As shown in Fig. 7, the paths of adjacent tapes around the lease bars are reversed, for instance, the first tape passes over the upper and beneath the lower lease bar, while the second tape passes beneath the upper and over the lower lease bar, the third tape over the upper and beneath the lower lease bar and so on.

The tapes from a tape supply reel are drawn around a pair of lease bars, between a pair of the draw rolls, through a reed device, and the ends of the tapes are then gathered into a tape bundle and passed into a projection mechanism 325. There are two projection mechanisms, one adjacent each end of the table, each secured to a mounting plate 326 that is vertically movable for purposes hereinafter described.

*Reed*

Figures 8, 9, 10:
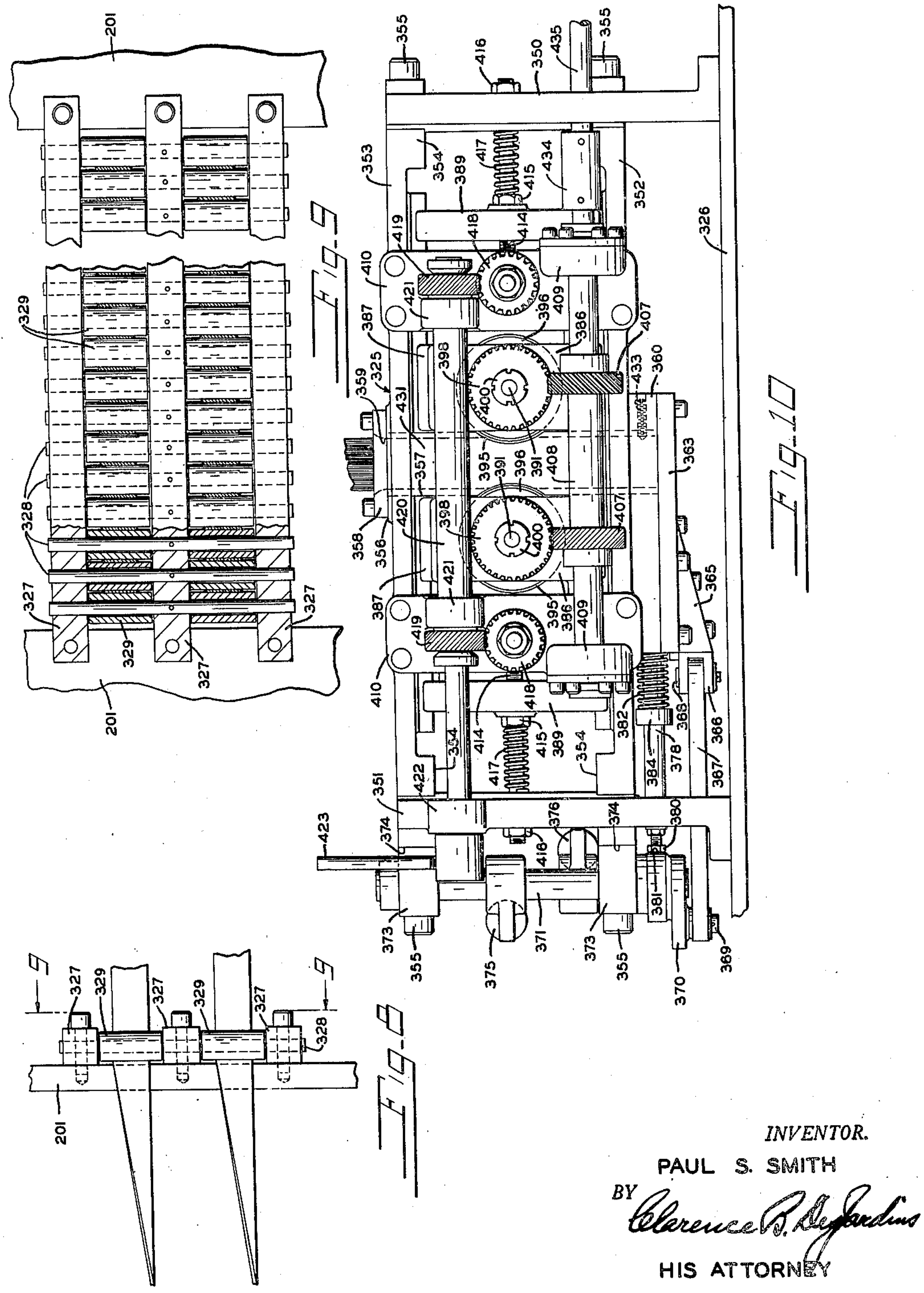
Fig. 8 is a partial fragmentary view in end elevation of the reeds at one end of the machine.
Fig. 9 is a detail, sectional view taken along the line 9—9 of Fig. 8, with some parts broken away.
Fig. 10 is a plan view of the projection mechanism.

A rectangular opening is formed in the mounting plate 201 (Figs. 4, 8 and 9), and extending across this opening and attached to the inner face of the plate, are located three parallel bars 327. A plurality of vertical pins 328 are inserted through holes drilled in the bars 327 to serve as pintles for the loosely fitting sleeves 329, the pins being located on centers exactly equal to the width of each of the tapes being handled. The sleeves have an outside diameter to provide spaces between them slightly greater than the thickness of each tape. This device constitutes a reed, whereby the several tapes, delivered in a horizontal plane from the underside of the lower draw roll 208 of the upper pair, or from the upperside of the draw roll 207 of the lower pair, are each given a quarter turn into a vertical plane and passed through adjacent spaces between sleeves 329 of the reed. The tapes are then gathered and compressed into a tape bundle as they are passed into one of two chutes of the projection mechanism, which is vertically adjustable to align either chute with the horizontal plane of the top surface of the table.

*Projection mechanism*

Figures 13, 14:
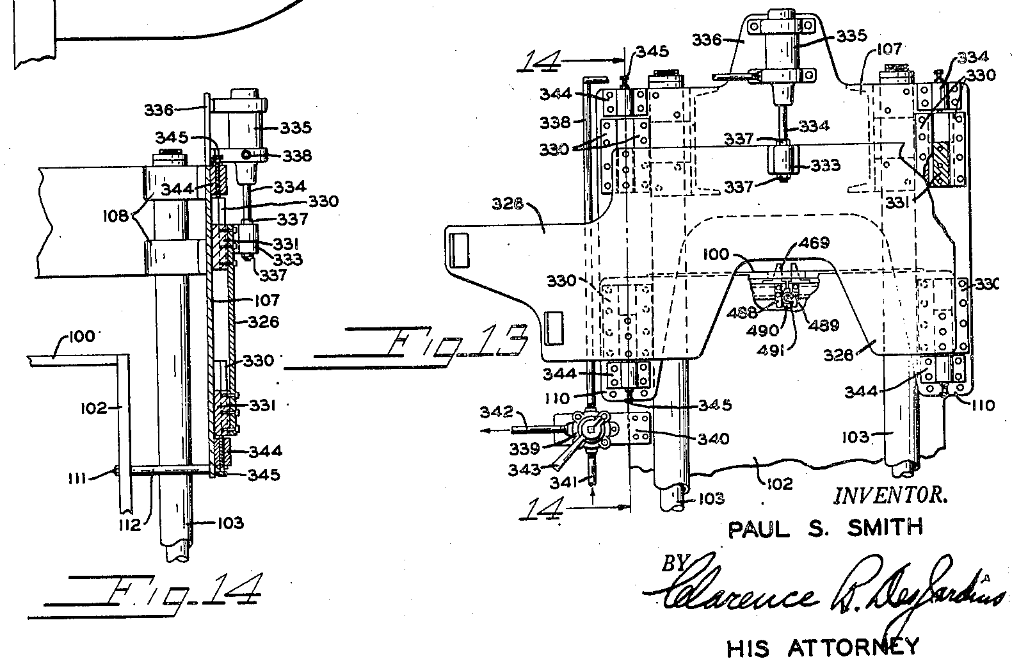
Fig. 13 is a fragmentary view of part of the support for the projection mechanism.
Fig. 14 is a detail, sectional view taken along the line 14—14 of Fig. 13.

Each end plate, 106 and 107, is attached to brackets 108, which support the channel bars 109 and 109*a*. Downwardly projecting portions 110 (Fig. 13) of the end plate 107 are tied to the end plate 102 by bolts 111 passing through spacing sleeves 112 (Fig. 14). L-shaped guide blocks 330 are attached to each of the corners of an end plate, such as end plate 107, and constitute guideways for four T-shaped blocks 331 that are attached to the four corners of the rear face of a mounting plate 326 and permit the mounting plate to slide vertically. A lug 333 is attached to the upper edge of the mounting plate 326, this lug 333 having a hole through which is passed a threaded end of a piston rod 334, the piston of which works in hydraulic cylinder 335. The hydraulic cylinder is mounted on the vertically projecting portion 336 of the end plate, 106 or 107, the piston rod 334 being held in position in lug 333 by means of jam nuts 337. A pipe 338 connects the portion of the hydraulic cylinder 335 below the piston with the supply port of a three way hydraulic control valve 339 which is attached to a bracket 340 that is on the lower end plate 101 or 102, depending whether it is at the right or the left end of the apparatus. The inlet port of the valve 339 is connected by a pipe 341 with a source of fluid, such as oil, under pressure. The discharge port of the valve is connected by a pipe 342 to a tank from which fluid may be pumped to the valve. When the handle 343 of the valve 339 is in the position shown in Figs. 13 and 17, the portion of the cylinder 335 below the piston is vented and the mounting plate 326, with its attached mechanism, is in its lower position. If the handle 343 of the valve is moved 90° clockwise, fluid under pressure is supplied to the portion of the cylinder 335 below the piston, thereby raising the mounting plate 326, and the projection mechanism carried thereby, to its upper position. Blocks 344, attached to the corners of the plate 106, are provided with adjusting screws 345 engaging the corresponding T-shaped blocks 331 to enable these upper and lower positions of the movable mounting plate to be determined within accurate limits.

There is a projection mechanism at each end of the table for gathering the tapes from the draw rolls into a tape bundle, each of the tapes having been turned by a reed device to be in parallel vertical planes, and feeding the tape bundle to the table. The projectors are of like construction, each having two separate chutes and rolls associated with each chute so that a tape bundle may be fed through either of said chutes to the table. Thus description of one projection mechanism will serve as a description of the other.

Figure 11:
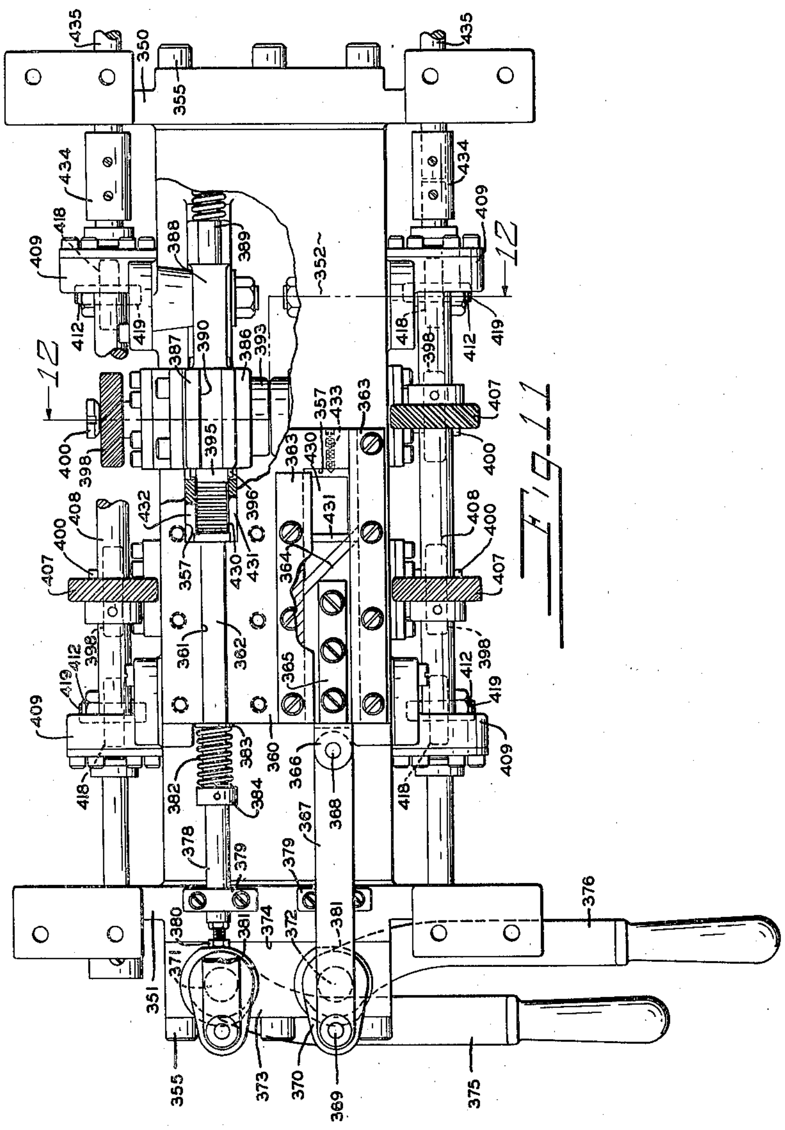
Fig. 11 is a view in side elevation of the projection mechanism, with some parts broken away and some removed.

Extending between two end frames 350 and 351 (Fig. 10) of the projection mechanism are an inner plate 352 and an outer plate 353, both of which are provided with bosses 354 that engage the end frame and are secured thereto by screws 355. On the center line of the outer plate 353, a bearing surface 356 is provided in which are formed two rectangular openings 357 that receive chutes of corresponding outer form, later to be described. The horizontal center lines of the openings 357 are disposed symmetrically with respect to the center line of the outer plate 353. A plate 358 is secured to the bearing surface 356, and is provided with the rectangular openings 359 corresponding with the internal dimensions of the chutes referred to. Inner plate 352 has two openings, corresponding to chute openings, which extend through a fixed boss 360, this fixed boss being provided with square grooves 361 for the accommodation of tape bundle clamping plungers 362 (Fig. 11). Attached to the machined surface of the fixed boss 360, are four L-shaped guide bars 363 which are adapted to retain and guide guillotine knives 364, slidably mounted therein and attached to the holders 365. Clevises 366 are provided on the ends of the holders 365.

The clevises 366 are pivotally connected with the ends of bars 367 by means of pins 368. The opposite ends of the bars are pivoted on crank pins 369 that are attached to crank discs 370. The crank discs 370 are fixed to the ends of the upper and lower crank shafts 371 and 372 which are journaled in bearings 373 that are attached to the bearing surfaces 374 of the end frame 351. Hand levers 375 and 376 are fixed to crank shafts 371 and 372 with the levers projecting downwardly. When the levers are projecting downwardly, their associated guillotine knives 364 are retracted so that the upward movement of either of the levers through 180° will cause its knife to advance across the opening in plate 352, through which the tape bundle is fed, to cut the butt end of said tape bundle which may be projecting therethrough. In order to facilitate this cutting off of the butt end of the tape bundle, the above mentioned clamping plungers 362 are provided, there being a clamping plunger for each knife. These plungers, preferably square in cross section, slide in the grooves 361 of boss 360 and are retained therein by the body of its associated guillotine knife 364. A cylindrical portion 378 of each plunger is supported slidably in a block 379 attached to the end frame 351 and has a screw 380 to bear against the cam surface 381 formed on the hub of a crank disc 370. A helical compression spring 382 surrounds the cylindrical portion 378 of each of the plungers 362 having one end bearing against a washer 383 that is in contact with the boss 360 and having the other end bearing against the collar 384, adjustably positioned on the plunger to compress the spring. The spring serves to return and hold the plunger normally in retracted position after it has been advanced by the rotation of the cam 381 to sever the butt end of the tape bundle and prepare a new tape bundle ready to be supplied to the table surface.

Figure 12:
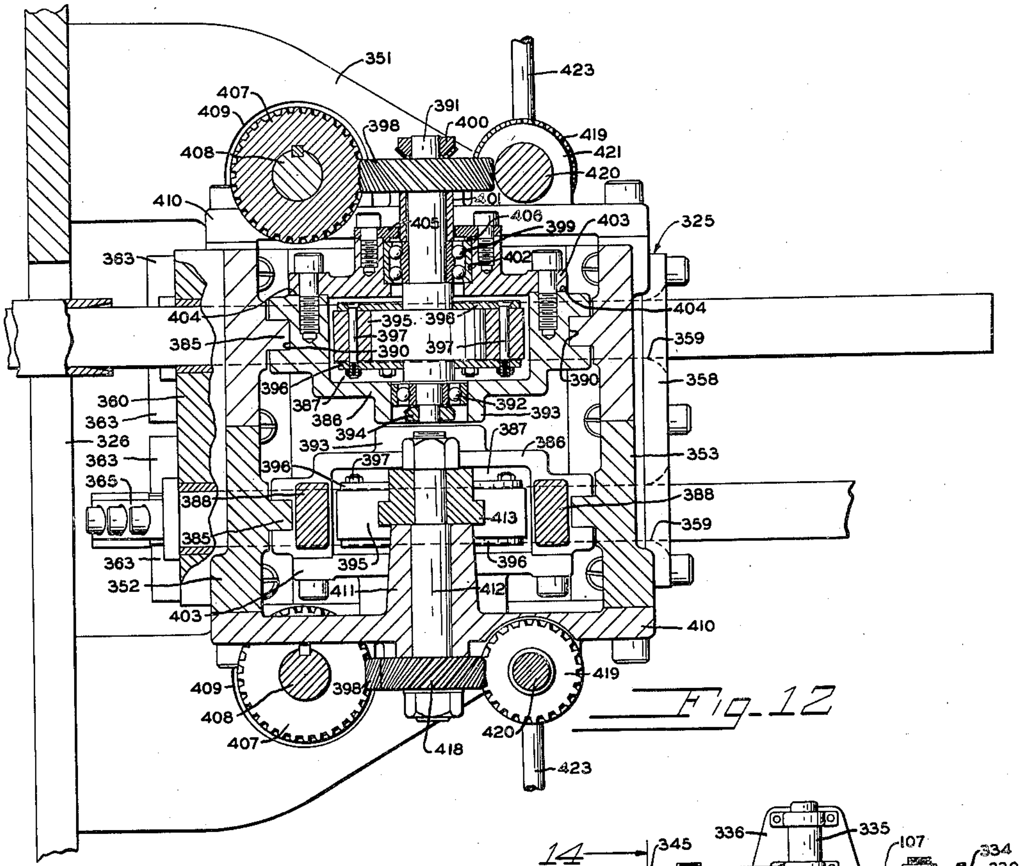
Fig. 12 is a detail, sectional view taken along the line 12—12 of Fig. 11, certain parts being broken away.

Internally projecting rails 385 are located on the horizontal center lines of openings 359 in the inner and outer plates 352 and 353 for having slidably mounted thereon two pair of upper and lower roll carriages 386 (Fig. 12). Each of the carriages consists of a U-shaped inner portion 387 which is connected by two longitudinally extending rectangular bars 388 to the transverse rectangular outer portion 389. The inner portion 387 and the outer portion 389 have laterally projecting portions in which machined grooves 390 are cut for fitting closely but slidably on the rails 385.

A vertically mounted spindle 391 is journaled in a ball bearing 392 whose outer race is supported in a cylindrical lug 393 that is formed centrally in the base portion of the U-shaped section of the carriage 386, and whose inner race is retained against the shoulder on the spindle 391 by a bearing lock nut 394. An intermediate enlarged portion of the spindle is surrounded by a tightly fitting rubber ring 395 which is secured thereon between circular plates 396 that are of a diameter slightly less than that of ring 395 so that the periphery of the rubber ring will extend beyond the peripheries of the plates. Bolts 397 secure the plates 396 to the enlarged portion of the spindle while other bolts fix and clamp the rubber ring 395 between the circular plates. Fixed to the spindle 391 is a spiral gear 398. A ball bearing 399 is locked against the shoulder of the spindle 391 by a lock nut 400 and sleeve 401. The ball bearing 399 is housed within a recess 402 within a cover plate 403 which is secured to the bearing surface 404 of the carriage body. A circular bearing retainer 405, having a rabbet 406, is secured to the outer surface of the cover plate 403 for clamping the outer race of the bearing 399 in place. The spiral gear 398 is adapted to mesh with a spiral gear 407, keyed to a drive shaft 408 which is journaled in ball bearings mounted in housings 409 on plates 410 that span the plates 352 and 353. On each of the inner surfaces of the bearing plates 410, a projecting lug 411 is provided to form a bearing for a spindle 412, and a cam 413 is keyed to the inner end of the spindle 412. The face of the cam 413 is adapted to engage the end of a stud 414 which is threaded centrally through the outer portion 389 of the roll carriage 386, and is secured thereto by a jam nut 415. The stud 414 extends through a hole in the adjacent end frames 350 or 351, its extended end being threaded to receive nut 416 so that the movement of the roll carriage 386 may be adjusted by positoning the nut. A helical compression spring 417 surrounds each stud 414 tending to maintain the opposing roll carriages adjustably in their advanced position with the rubber rings frictionally engaging the opposite sides of the tape bundle.

There is a spindle 412 and attached cam 413 associated with each carriage. Spiral gears 418, attached to the outer ends of the spindles 412 and associated with each opposing pair of carriages, are adapted to mesh with spiral gears 419, two of which are secured on each of two longitudinally extending release shafts 420, which are journaled in bosses 421 formed on the bearing plates 410. These shafts extend through bosses formed on the end frame 351 and have handles 423 attached thereto. A quarter-turn rotation of either of these handles correspondingly rotates the associated gears 418 and 419 to bring the lobes of the cams 413 into contact with the ends of the studs 414, thereby retracting the associated pair of roll carriages from their advanced position to facilitate the insertion of a tape bundle between the rolls thereof.

Upper and lower chutes 430, each consisting of a U-shaped body 431 and a rabbeted cover 432, are adapted to fit slidably within the rectangular opening 359 of the inner and outer side plates 352 and 353, and are retained in position by having the cover plate 358 abutting against one end. The opposite ends of the chutes extend into the boss 360 and are secured by set screws 433. The vertical inside dimension of each chute is slightly greater than the width of the strips to be handled, and the inside horizontal width is slightly greater than the total thickness of the number of strips which are included in the bundle. The opposite sides of each chute are milled out on a radius slightly greater than that of the rubber rings 395 to provide openings for enabling said rings to project through the openings within the body of the chute and make pressure contact with the bundle of tapes that is passing therethrough between said rings.

I provide upper and lower projecting roll drive shafts 408 which are joined by sleeve couplings, such as 434, to the extension shafts 435 that pass through holes in the end plate 350. On the projecting end of the upper drive shaft 435 (Fig. 1) a hand wheel 436 is keyed. There is also fixed to this upper drive shaft a sprocket 437 connected by a chain 277 with the sprocket 275, which, as previously described, is attached to the sprocket 262 which drives the upper pair of draw rolls on the reel stands. On the projecting end of the lower drive shaft extension 435, a hand wheel 438 is keyed, and a sprocket 439 is connected by the chain 278 to the sprocket 276 which, as previously described, is connected to the sprocket 265 which drives the lower pair of draw rolls on the reel stand. Either of the projector chutes may be aligned with the top of the table, depending on which supply reel is being drawn from.

A guiding chute 450 (Fig. 17) is advantageously mounted on each end of the table 100 for receiving a tape bundle, from either chute 430 of the projection mechanism, and conducting it to the top surface of the table in position to be grasped by the table jaws hereinafter described. The chute is rectangular in cross section, conforming with the cross section of the projector chutes. That end of the chute which is adjacent the projector chute, or chutes, is preferably chamfered on its inside edges at 452 to facilitate entrance of the tape bundle thereinto. The guide chute is attached to the table by means of flanges 453 formed integral with the chute. Suitable fastening means, such as bolts 454, project through the flanges on the chute into the table for holding said chute in place on the table. The bottom portion of the chute 450 which is on the table is preferably open, the open bottom side being closed by the top surface of the table fitting thereagainst. The prepared end of a new tape bundle is fed through the table chute and gripped by the outer table jaws to be held in proper position for being gripped by the carriage in its cycle of operation. The carriage is provided with two pairs of gripping jaws 466 and 467, one pair 466 of which will grip the end of the tape bundle when the carriage is moving from the right to the left end of the table, while the other pair 467 will grip the end of the bundle when the carriage is traversing the length of the table from left to right. These two pair of jaws are alternately retracted and projected vertically from the bottom of the carriage by suitable operating mechanism within the carriage (not shown) but driven by splined shaft 144 previously referred to. Suitable operating mechanism within the carriage for the carriage jaws and driven by this splined shaft is shown in my application Serial No. 13,303. The particular operating mechanism within the carriage forms no part of the present invention and therefore is only generally referred to and incorporated here by reference to my earlier application.

*Table gripping jaws and strip bundle cutting means*

The table gripping jaws comprise a pair of inner jaws 468 and outer jaws 469 at each end of the table. The inner and outer jaws grip a tape bundle while it is being severed to form a strip bundle by moving the saw between the inner and outer pair of table jaws. After the strip bundle has been severed from the tape bundle, the inner pair of table jaws is retracted, and the end of the tape bundle is held by the outer pair of table jaws until it is grasped by the carriage jaws. Then, the outer pair of table jaws will be automatically retracted to release the tape bundle and permit it to be drawn along the table by the carriage. The particular construction of the table jaws and their operating mechanism are fully disclosed in my application Serial No. 13,303 to which reference is made, as the particular construction of that mechanism is not a part of the present invention. Means are, however, provided in the instant case, as hereinafter described, for permitting the outer table jaws 469 to be manually operated for the removal of the butt end of a tape bundle resulting from an exhausted supply reel.

Means are provided for severing the tape bundle to form a strip bundle each time that a tape bundle is drawn along the table by the carriage, said means comprising two cutting units, typified by saws 470 and 471. One cutting unit 470 is at the right end of the table, and the other cutting unit 471 is at the left-hand end of the table. These cutting units are shown in Figs. 1 and 1*a* in plan view. The vertical plane of each saw is at right angles to the longitudinal line of the table, and each saw can be moved at timed intervals across the table between the inner and outer table jaws to sever a strip bundle from a tape bundle that is clamped by said inner and outer table jaws, to form a strip bundle therefrom.

Each cutting unit is on a support 472 which is movably mounted upon the table 100 and comprises a circular saw 473, within a guard 474, an electric motor 475, and driving connections between said saw and motor. The driving connections include gearing, within casing 476, connected to the saw shaft 477 and a transmission shaft 478, the latter being connected to the output motor shaft 479 by a coupling 480. The specific construction for movably mounting the saw is shown in my application Serial No. 13,303 and forms no part of the present invention. Each saw is actuated automatically at a predetermined point in the cycle of operation to sever a strip bundle from a tape bundle after the latter has been drawn along the table and positioned by the carriage.

When a reel supply is near exhaustion and a new reel supply is to be used, it is necessary to remove the butt end of a tape bundle from the outer table jaws and to feed to them a previously prepared end of a new tape bundle, without interruption of the continuous operation of the machine. Means are provided for the operator to manipulate, without interfering with their automatic operation, the outer set of table jaws to release the butt end of the exhausted tape bundle and permit its withdrawal.

The outer table jaws 469 are fixed to the top of blocks 485 which are slidably mounted upon a bar or rod 486 that is supported at its opposite ends upon the cam box or casing 487. A cam shoe 488 is attached by a fastening means 489 to each of the slidable blocks in spaced apart relation for a cam 490, mounted on the end of shaft 491, to be inserted therebetween. This shaft 491 is journaled in a flanged pedestal bearing 492 which is bolted at 493, through the flange, to the cam box or casing. Another flanged pedestal bearing 494 is bolted to the mounting plate 102 in position for an extension shaft 495, journaled therein, to be in axial alignment with shaft 491 and be coupled thereto by a sleeve coupling 496. The opposite end of the extension shaft 495 has a spiral gear 497 thereon adapted to mesh with a spiral gear 498, the latter spiral gear being fixed to a shaft 499 which is journaled in a bracket bearing 500 on the mounting plate 106. A handle 501 is fixed to one end of the shaft 499. With the parts in the position shown in the drawings (Fig. 17), the outer table jaws are in normal clamped position, as they remain during and following the passage of the severing saw. A quarter or 90° angle turn of the handle to a horizontal position rotates the cam correspondingly to bring the lobes of the cam in a horizontal position and spread the jaws apart to release the butt end of the tape bundle and to permit its withdrawal and the insertion of the end of a new tape bundle from another supply reel. Return of the handle to vertical position permits the jaws to reclamp and hold the substituted new tape bundle in position ready to be clamped by the carriage upon its return to that end of the table.

*Operation*

To have the above described machine operate with the tapes drawn from the upper supply reels at opposite ends of the table, the clutches 267 and 267*a* are manipulated by their respective handles to throw into gear the driving mechanism for both upper pairs of feed rolls 207, through chains 260 from power transmitted to the drive shafts 132 and 136. A supply of tapes from each upper reel is unwound over its respective idler or deflecting roll to pass alternately over and under the lease bars, to space same and prevent adjacent tapes from overlapping before being threaded between the draw rolls. The tapes are given a quarter turn and passed through the reed, after they leave the draw rolls, to arrange them edgewise into a vertical plane to be gathered into a tape bundle by a projection device. The tape bundle is discharged from the upper chute of the projector mechanism, in which it is compressed by the feed rolls, to the guide chute 450 that is attached to the top of the table, there being a chute 450 at each end of the table. The tape bundle is first trimmed by the guillotine knife in its associated projector device and prepared for being fed to said guide chute at the top of the table. As the tape bundle emerges from this chute at the top of the table its end is clamped by the outer pair of clamping jaws on the table ready to be gripped by the carriage in its cycle of operation and drawn along the table.

The operation of the machine is intermittent with a tape bundle being alternatively drawn from supply reels at opposite ends of the table. Two supply reels, one at each end of the table, are being continuously drawn from. While tapes are being drawn alternately from two of the oppositely disposed reels, tapes from the other two reels are gathered into bundles and inserted through respective draw rolls and projectors ready to be used at any time after the tape supply from the first two reels has been exhausted, to be discharged upon the table ready for use without interrupting or stopping the machine. Thus the continuous constant feed supply of tape from opposite ends of the table is assured, the changeover from one to the other of the two supply reels at each end of the table being effected by simply manipulating a clutch lever for changing from one supply reel to another at the ends of the table. There is, as above described, one clutch lever for changing over from one to the other of the two supply reels at one end of the table, and another clutch lever for changing over from one to the other of the two supply reels at the other end of the table.

When the changeover is made from an upper supply reel to a lower supply reel, the mounting plate 326 on which the projector mechanism is mounted is elevated to bring the lower chute 430 thereof in alignment with the table chute 450. Conversely, the mounting plate 326 is lowered when the changeover is made from the lower to the upper supply reel. The mounting plate is raised or lowered by turning handle 343 of the control valve 339 to operate the hydraulic cylinder 335 to which the mounting plate is attached. A tape bundle is fed from either the upper or lower supply reels and passed through the table chute, from which it emerges on the top of the table, to have its prepared projecting butt end portion clamped between a pair of the outer table jaws and positioned to be subsequently grasped by a pair of the carriage jaws and drawn along the table in the course of the cycle of movement of the carriage. The outer table jaws will automatically release the tape bundle when it is drawn by the carriage along the table for a predetermined length for having a strip bundle cut therefrom, said tape bundle being gripped by both the inner and outer table jaws, after having been drawn along the table to have the strip bundle severed from the end of the tape bundle. The saw unit, in its cycle of operation, will move between adjacent inner and outer table jaws while the tape bundle is clamped by them, after which the saw will be retracted, and the severed strip bundle will be moved by transfer fingers, projecting through slots in the table, to the magazine of the cemented pile fabric machine.

After a strip bundle is cut from a tape bundle that has been fed in from one end of the table, the carriage in its cycle of movement will return to the opposite end of the table and draw with it a tape bundle from the supply tape reel from that end of the table and come to rest with the end of the bundle so drawn, deposited immediately adjacent the end of the tape bundle from which a strip bundle has just been severed and which end is clamped between the outer table jaws. The last tape bundle which has been drawn along the table is gripped between the other set of inner and outer table jaws, severed by the other saw unit into a strip bundle, and likewise gripped by transfer fingers, projecting through slots in the table, and moved forward into contact with previously severed strip bundles in the magazine.

There are two pairs of carriage jaws, one pair of jaws being used to grip the tape bundle which is fed from one end of the table and the other pair of jaws being used to grip the tape bundle which is fed from the opposite end of the table. At the same time that a pair of carriage jaws is projected to clamp the present tape bundle at a point between the outer table jaws and the end of the table chute, said outer table jaws are opened and retracted below the surface of the table, out of the way of the tape bundle that is next traversed along the length of the table. The inner table jaws are at this time already retracted below the surface of the table, they having been retracted after the strip bundle had been severed from the tape bundle which had last been drawn along the table by the carriage.

The carriage is reciprocated along the length of the table by the reversible hydraulic drive unit 124, said unit being controlled by the cam switch 165 alternately energizing the solenoids 163 and 164 at proper periods in the cycle to control the lever mechanism which shifts the output shaft of the unit to rotate in either direction. The hydraulic drive unit is not only reversed by the lever mechanism between the solenoids and the control shaft of said unit, but its speed is controlled by the cam mechanism which is associated with a roller on this lever mechanism. The hydraulic drive transmits power through the gear reducer 127 to rotate the shaft 132 on which sprocket 134 is mounted for receiving the sprocket chain 139 that drives the carriage. The chain which passes around sprocket 138, at the same time that the carriage is driven, drives the shaft 136, miter gear unit 306, the shaft 311, the miter gear unit 310 and the outer driving member 314 of the free wheeling clutch 315. As the carriage is proceeding toward the right hand reel stand with which the above mentioned parts are associated, the shaft 288*a* is not driven, and the reel supply and projection mechanism at the right end of the table remain idle.

The miter gear unit 131, the connecting shaft 296, the miter gear unit 293, and the free wheeling clutch 289 are simultaneously driven by the shaft 132. The free wheeling clutch 289 drives the shaft 288 as the carriage is moving to the right end of the table, causing the gears 286 and 287 to be driven, with the chain 282 and the connected sprockets 283 and 284 driving the clutch shaft 266. By means of a corresponding clutch member, the attached sprocket 262 drives the chain 260, the sprocket 261, and the draw rolls 207. Companion feed rolls 207 are driven through the gears 210 and 212. The tapes are accordingly drawn from the upper supply reels 225 through the lease bars 317, draw rolls 207 and 208, and the reed which is disposed to arrange the tapes edgewise to the table surface. At the same time, the chain 277, between sprockets 275 and 437, drives the upper shaft 435, the spiral gears 407 and 398, and the upper projection roll pair, between which the bundle of tapes from the reel is compressed and frictionally driven through the upper chute of the projection device and the table chute into position to be drawn by the carriage traveling from the right to the left of the table.

As the carriage nears the right-hand end of the table, drawing a tape bundle from a supply reel on the left-hand reel stand, and comes against the bumper or stop in position for a strip bundle of proper length to be cut from the tape bundle, the outer table jaws 469 and the inner table jaws 468, at the left-hand end of the table, are projected above the table surface to clamp the tape bundle, preliminary to the movement of the left-hand saw severing the tape bundle on a line between said inner and outer table jaws. The inner table jaws then are retracted, leaving that portion of the bundle which is projecting from the table chute remaining clamped between the outer table jaws, pending return of the carriage to the left-hand end of the table. As the severed strip bundle is released by the inner table jaws, it is gripped by transfer fingers projecting through slots in the table surface, and moved to the magazine of the cemented pile fabric machine with the previously severed strip bundles. The transfer fingers for removing the severed strip bundles from the table to the magazine of the cemented pile fabric machine are arranged to operate alternately, so that part of them will remove one strip bundle from the table as the other fingers are being returned to remove the next strip bundle that is to be severed from a tape bundle.

Furthermore, as the carriage comes against the stop or bumper at the right-hand end of the table while decelerated in speed to near zero, it is held by the hydraulic drive against the stop or bumper until an element of the main cam switch energizes the other solenoid to shift the lever 156 for moving the roller 185 into contact with the other cam 183 and also turning the control shaft 150 to reverse the direction of the hydraulic motor for returning the carriage to the left and drawing tape material from the right reel stand. The carriage reciprocates along the table drawing therewith a tape bundle alternately from the supply reels at opposite ends of the table until either of the reels is near exhaustion of supply tapes. Before either of the supply reels of one reel-stand is completely exhausted the operator will have a tape bundle ready to be fed into the machine from the alternate supply reel.

A full supply reel is lifted into position on the reel support, usually by an overhead hoist as the full supply reels are large and heavy, with the ends of the reel mandrel dropped into the inclined slots of the suspended supporting arms. One end of the reel mandrel is connected to the brake drum shaft by the splined coupling sleeve. The arm which carries the follower roller that bears against the tapes on the reel is preferably mounted in a socket in the arm of the lever unit so that it can be readily removed when a new supply reel is being placed upon the reel support.

The ends of the tapes on a new supply reel may be advantageously secured by a transversely disposed strip of gummed paper. Each of the lease bars can be removed from its supporting pins and inserted transversely of the tapes with adjacent tapes disposed alternately above and below the lease bars. Thereafter the lease bars are placed in position on the pins with the tapes threaded therethrough. The tapes, with the gummed paper thereon, are then threaded through a draw roll set. The lease bars can be inserted in place between the tapes after, rather than before, the tapes have been threaded through the draw roll pair. In threading the tapes through a draw roll set, the hand wheel 220 is given a half turn to actuate the rocker arms and space the draw roll 207 away from the other draw roll 208 of the draw roll pair so that the ends of the tapes from the new tape supply reel can be readily inserted therebetween. Thereafter, the draw roll 207 is moved by turning back the hand wheel, toward the other draw roll into contact with the tapes which have been placed between the rolls.

The tapes are drawn through the draw roll pair for a substantial distance so that their ends will project somewhat beyond the mounting plate. This can be effected by turning the hand wheel on the upper roll of the draw roll pair. The gummed paper strip across the butt ends of the tapes is removed to free the ends of the tapes and permit them to be inserted in the openings in the reed, the tapes being given a quarter turn so that their opposite longitudinal edges will be vertically disposed edgewise to the top surface of the table.

The free ends of the tapes are next threaded through the inactive chute 430 and its associated set of feed rolls. This is readily effected by turning the appropriate release handle 423 which, through spiral gears 418 and 419, rotates the cams 413 against the adjacent portions of the carriages 386 to space apart the corresponding feed rolls of the projector. The free ends of the tapes which have been drawn through the reed are gathered by hand into a bundle and passed through the chute 430 with all of the ends extended beyond the vertical plane of the knife 364. The release handle 423 is returned to normal position, thereby permitting the springs 417 to move the opposing carriages 386 and compress the bundle of tapes in the chute between their feed rolls. The appropriate lever 376 (or 375) is manually turned to advance the plunger 362, thereby clamping the tape bundle whose free end projects through the chute, and also to move the knife to trim off the butt end of the tape bundle. Thus prepared, the tapes from the supply reel are ready to be fed to the machine through the table chute 450 when the projector device is aligned to bring the newly supplied projector chute 430 in alignment with the table chute. This shifting will be done when the operator observes that the supply reel then in use is so nearly exhausted that there are only enough tapes left thereon for a last complete strip bundle being cut from the tape bundle.

When the last practicable draw of a tape bundle has been made from the current supply reel and the strip bundle is severed therefrom, the projection mechanism is shifted vertically and shift clutch lever 273 is moved to disconnect the driving mechanism from the draw roll pair and projector device for that reel. With this same shifting of the clutch, the driving mechanism for the other draw roll pair and projecting device is connected. By reason of the free wheeling clutch 315, the latter draw roll pair and projector device can, also, be rotated by hand in a feeding direction to feed the free end of the new tape bundle from the new reel supply into position through the table chute to be gripped by the outer table jaws.

At the same time that the shift clutch is moved by the shift lever 273, release handle 501 is turned to open the outer table clamping jaws 469. With a few turns of the hand wheel 213 of the draw roll pair, the butt ends of the exhausted reel of tapes can be withdrawn from jaws 469 through the table chute and the chute of the projector. The projector mounting plate is then moved by means of the hydraulic device to a position with the newly supplied projector chute aligned with the table chute. The proper elevation of the mounting plate to align either projector chute is regulated by the adjusting screws 345 which limit movement of said plate. By manipulation either of the hand wheel on the approprite draw roll pair, or of the hand wheel on the corresponding drive shaft extension 435, the end of the new tape bundle is moved into and through the table chute, and to the saw severing line, immediately beyond the outer table jaws which have been opened to receive and grip it. The release handle 501 is then returned to its original position so that the cam will release the outer table jaws, permitting them to grip the bundle and to return to automatic operation. This changeover from the tape supply on one supply reel to a tape supply on the other supply reel, and extraction of the butt ends of the tapes from the exhausted supply reel, is made without interference with, or interruption of, the continuous operation of the machine which the tapes supply.

The changeover from the lower to the upper supply reel, or vice-versa, is made while the carriage is at the end of the table opposite to that at which the changeover is being made. Thus, when the carriage returns in its normal cycle of movement from the opposite end of the table, the changeover to a new supply reel will have been completed with the prepared end of the new supply tape bundle clamped between the outer table jaws in position ready to be received by the carriage jaws.

In each machine cycle, the carriage is moved along the length of the table and back again, and two strip bundles are cut from two tape bundles, one tape bundle being drawn from each end of the table. The carriage dwells at the end of the table for a substantial length of time while various operations are taking place in certain sequence, among which is the cutting of a strip bundle from a tape bundle. This cutting takes place soon after the carriage has completed its movement along the table, and it is important that there be proper positioning of the tape bundles which have been drawn along the table and that they be held taut in proper position so that the strip bundles will be cut into exact lengths. Exact positioning of the tape bundles and holding them taut until the strip bundles have been cut therefrom, are obtained by the hydraulic drive of the carriage.

I am aware that the apparatus shown and described herein is susceptible of considerable variation without departing from the spirit of my invention and, therefore, I claim my invention broadly as indicated by the appended claims.

Having thus described my invention, what I claim as new and useful, and desire to secure by Letters Patent, is:

1. In a strip-forming and feeding apparatus including a table, a carriage movable to and fro to draw a tape bundle along said table and table jaws automatically operable to clamp and release the end of a tape bundle resting on said table, means for feeding a tape bundle to said table comprising the combination of a reel stand at one end of the table including a pair of horizontal mandrels, on each of which a plurality of coils of tape are mounted side by side for rotation about a horizontal axis; a projection device mounted adjacent said end of the table and having means for receiving two tape bundles therein; means for gathering and condensing the tapes from each set of coils into a separate tape bundle, in which the tapes have their width vertically disposed, for reception by said projection device; and means for shifting said projection device vertically for bringing one or the other of said tape bundles into operative relationship to said table.

2. The combination of claim 1 in which the projection device includes a pair of chutes for receiving the tape bundles and the shifting of said device aligns the bottom of one or the other of said chutes with the top surface of the table.

3. The combination of claim 2 in which the projection device includes a pair of feed rolls for each chute having portions projecting through the walls thereof into contact with the tape bundle therein, and means for driving said rolls.

4. The combination of claim 3 in which means are provided for causing the driving means for said pairs of feed rolls to be selectively operable to feed one or the other of said tape bundles through its chute.

5. The combination of claim 4 including a pair of driven draw rolls provided for each mandrel to draw tapes from the coils thereon and feed them to the projection device and means for driving said draw rolls.

6. The combination of claim 5 in which means are provided for causing the driving means for the draw rolls to be selectively operable to draw tapes from one or the other of said sets of coils.

7. The combination of claim 6 in which the projection device includes means for severing the projecting end of a tape bundle in each chute.

8. The combination of claim 7 in which the projection device includes a pair of knives, one for each chute and manually operable means for moving each knife transversely of its chute to sever the projecting end of a tape bundle therein.

9. The combination of claim 8 in which the projection device includes a pair of plungers, one for each knife, and manually operable means for moving each plunger against the side of the corresponding tape bundle in its chute, to clamp said tape bundle against a wall of the chute while the knife severs the end thereof.

10. The combination of claim 9 in which there are means connecting said manually operable means to a knife and to a plunger so that the same manually operable means projects a knife and the plunger associated therewith.

11. The combination of claim 10 in which each feed roll of a pair is retractable from feeding position and including means for retracting said rolls from the corresponding chute.

12. The combination of claim 11 in which each feed roll of a pair is mounted on a slidable carriage, and manually operable means are provided for moving said carriages away from each other.

13. The combination of claim 12 in which a reed is provided for each set of tape coils, and the tapes pass from the draw rolls through said reed to the projection device and are twisted through a right angle by said reed to arrange the tapes edgewise and in parallelism.

14. The combination of claim 13 in which there are provided a pair of lease bars and the tapes from each set of coils pass around said pair of lease bars before passing between the draw rolls, adjacent tapes passing in paths about opposite sides of lease bar.

15. The combination of claim 1 in which means is provided to slidably mount said projection device which means is placed adjacent the end of the table.

16. The combination of claim 15 in which a fluid pressure device is provided for shifting the projection device vertically.

17. The combination of claim 16 in which said fluid pressure device includes a fixed cylinder, a piston working therein and having a piston rod connected to said projection device, and a manually controlled valve connected to the space in said cylinder below the piston, and a source of fluid pressure, for admitting pressure to said space and venting it therefrom.

18. The combination of claim 1 including manually operable means for releasing said table jaws to permit removal of the butt end of a tape bundle.

19. The combination of claim 18 in which said releasing means include a rotatable shaft supported by the table, a cam on said shaft and located between parts fixed to the table jaws and manually operable means for rotating said shaft to spread said jaws.

20. In a strip-forming and feeding apparatus including a table and a carriage movable to and fro to draw a tape bundle across said table, the combination of driving means for moving said carriage; a reel stand at one end of the table including a pair of horizontal mandrels, on each of which a plurality of coils of tape are mounted side by side for rotation about a horizontal axis; a projection device mounted adjacent said end of the table and having means for receiving two tape bundles therein; means for gathering and condensing the tapes from each set of coils into a separate tape bundle for reception by said projection device; means for each tape bundle for feeding it through the projection device; means for driving said feeding means from said carriage moving means; and means for shifting said projection device vertically for bringing one or the other of said tape bundles into operative relationship to said table.

21. The combination of claim 20 in which means are associated with the means for driving said feeding means so that the feeding means are driven at a lineal speed equal to the speed of carriage movement in one direction.

22. The combination of claim 21 in which the driving means for the carriage is provided with means for moving said carriage at variable speed reaching a maximum toward the midpart of its traverse, the speed increasing as the carriage moves from a position of rest and decreasing as the carriage approaches its opposite position of rest.

23. The combination of claim 22 in which the means associated with the driving connections for the feeding means include an overrunning clutch, forming a one-way drive.

24. In a strip-forming and feeding apparatus including a table and a carriage movable to and fro to draw a tape bundle across said table, the combination of driving means for moving said carriage; a reel stand at one end of the table including a pair of horizontal mandrels, on each of which a plurality of coils of tape are mounted side by side for rotation about a horizontal axis; a pair of draw rolls for each set of coils, for drawing tapes therefrom; means for driving said draw rolls from said carriage moving means; a projection device mounted adjacent said end of the table and having means for receiving two tape bundles therein; means for gathering and condensing the tapes from each pair of draw rolls into a separate tape bundle for reception by said projection device; and means for shifting said projection device vertically for bring one or the other of said tape bundles into operative relationship to said table.

25. The combination of claim 24 in which means is associated with the draw roll driving means so that the draw rolls are driven at a linear speed equal to the speed of carriage movement in one direction.

26. The combination of claim 25 in which the driving means for the carriage is provided with means for moving said carriage at variable speed, the speed increasing to a maximum and then decreasing as the carriage moves from one position of rest to the other.

27. The combination of claim 26 in which the driving connections for the draw rolls include an overrunning clutch, forming a one-way drive.

28. The combination of claim 27 including feeding means for each tape bundle for feeding it through the projection device and means for driving said feeding means from said carriage moving means at a linear speed equal to the speed of carriage movement in one direction.

29. The combination of claim 28 including a pair of chutes in the projection device, for receiving said tape bundles, a pair of feed rolls for each chute adapted to engage the tape bundle therein, said rolls constituting the feeding means, and being driven from the carriage moving means for driving said rolls at a linear speed equal to the speed of carriage movement in one direction.

30. The combination of claim 29 in which the driving connections for the feed rolls include driving connections from the draw roll drive and means whereby both draw rolls and feed rolls may be actuated independently of carriage movement.

31. In a strip-forming and feeding apparatus including a table and a carriage movable to and fro to draw a tape bundle across said table, the combination of a carriage driving shaft; means for rotating said shaft alternately in opposite directions; connections between said carriage and said shaft for moving the carriage to and fro along the table; a reel stand at one end of the table including a pair of horizontal mandrels, on each of which a plurality of coils of tape are mounted side by side for rotation about a horizontal axis; a pair of draw rolls for each set of coils, for drawing tapes therefrom; a projection device mounted adjacent said end of the table and having means for receiving two tape bundles therein; means for gathering and condensing the tapes from each pair of draw rolls into a separate tape bundle for reception by said projection device; means for shifting said projection device vertically for bringing one or the other of said tape bundles into operative relationship to said table; a member connected to and driven by said carriage driving shaft; a draw roll shaft; driving connections between said member and draw roll shaft; and driving connections between said draw roll shaft and said pairs of draw rolls.

32. The combination of claim 31 in which there is a driving member fast on the draw roll shaft, a pair of driven members rotatable on said shaft, a selectively operable clutch for connecting a selected one of said driven members to one of the pairs of draw rolls.

33. The combination of claim 32 in which the driving connections between the member and the draw roll shaft include an overrunning clutch forming a one-way drive.

34. The combination of claim 33 including a projection device having two pairs of feed rolls, one for feeding each of said tape bundles, and driving connections between each of said driven members and one pair of said feed rolls.

35. In a strip-forming and feeding apparatus including a table, a carriage movable to and fro to draw a tape bundle along said table, and stops determining the limits of carriage movement, the combination of a driving motor; an hydraulic transmission having an input shaft, connected to and driven by said motor, and an output shaft; and carriage moving means actuated by said output shaft.

36. The combination of claim 35 in which the hydraulic transmission is such as to drive the output shaft in either direction, and is provided with a control shaft to determine the direction of rotation of the output shaft.

37. The combination of claim 36 in which the hydraulic transmission is provided with means to drive the output shaft in either direction at variable speeds and the control shaft determines the speed as well as direction of rotation of the output shaft.

38. The combination of claim 37 including means for automatically operating the control shaft, at predetermined points of the cycle, to reverse the direction of rotation of said output shaft.

39. The combination of claim 38 including means controlled by carriage position for controlling movement of the control shaft to determine the speed of rotation of said output shaft.

40. The combination of claim 39 in which the mechanism governing the control shaft includes a pivoted lever, an arm on the control shaft and a connection between one end of said lever and said arm.

41. The combination of claim 40 in which said governing mechanism includes an over-center spring connected between a fixed point and a point on the lever remote from its pivot, said spring tending to move the lever from dead-center position.

42. The combination of claim 41 in which the governing mechanism includes a pair of solenoids, each having a core adapted to engage said lever and shift it when the solenoid is energized, and means for automatically energizing said solenoids at predetermined points of the cycle.

43. The combination of claim 42 in which the governing mechanism includes a pair of cams, means for rotating the cams from the output shaft, and a cam follower on said lever engaging one or the other of said cams according to the position of the lever on one side or the other of dead-center, whereby the displacement of the control shaft from neutral is increased as the carriage moves away from end position and decreased as it approaches an end position.

PAUL S. SMITH.

No references cited.